US012162026B2

(12) United States Patent
L'Henaff et al.

(10) Patent No.: US 12,162,026 B2
(45) Date of Patent: Dec. 10, 2024

(54) SHOWER SYSTEM

(71) Applicant: AS America, Inc., Piscataway, NJ (US)

(72) Inventors: Jean-Jacques L'Henaff, New Canaan, CT (US); Walter Pitsch, Washington, NJ (US); Verne Myers, Fort Wayne, IN (US); Xiaojing Ye, Edison, NJ (US); Greg Reinecker, Brooklyn, NY (US); Brian Kalember, Indianapolis, IN (US); Gabriela Ravassa, Brooklyn, NY (US); Emilie Williams, New York, NY (US); Alanna Wing Libbrecht, Madison, NJ (US)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 17/855,202

(22) Filed: Jun. 30, 2022

(65) Prior Publication Data

US 2022/0331819 A1 Oct. 20, 2022

Related U.S. Application Data

(63) Continuation of application No. 15/865,096, filed on Jan. 8, 2018, now Pat. No. 11,400,462.

(Continued)

(51) Int. Cl.

*B05B 1/18* (2006.01)
*B05B 1/16* (2006.01)

(Continued)

(52) U.S. Cl.

CPC .............. *B05B 1/185* (2013.01); *B05B 1/169* (2013.01); *B05B 1/18* (2013.01); *B05B 15/62* (2018.02); *E03C 1/0408* (2013.01); *E03C 1/0409* (2013.01)

(58) Field of Classification Search

CPC ... B05B 1/185; B05B 1/16-169; B05B 15/62; B05B 15/654; B05B 15/65;

(Continued)

(56) References Cited

U.S. PATENT DOCUMENTS

D509,561 S 9/2005 Kobi
D559,945 S 1/2008 Patterson (Continued)

FOREIGN PATENT DOCUMENTS

CA 2576892 C 6/2011
CN 101218035 A 7/2008

(Continued)

OTHER PUBLICATIONS

Amazon. (Feb. 2009) "Alsons 6465CPK Two in One Shower, Chrome" located at http://www.amazon.com/gp/product/images/B001H9NWVM/ref=dp_image_0?le=UTF8&n=228013&s=hi (2 pages).

(Continued)

*Primary Examiner* — Joseph A Greenlund
*Assistant Examiner* — Juan C Barrera
(74) *Attorney, Agent, or Firm* — Morrison & Foerster LLP

(57) ABSTRACT

Described are embodiments of a shower assembly that includes modular components that can be removably attached and may be replaced or interchanged with corresponding components having different form factor or design. In some embodiments, the shower assembly includes a diverter unit fluidly coupled to a fluid source and the diverter unit is configured to selectively direct flow of fluid from the fluid source to one or both of a shower head and a hand shower. The shower head includes a first plurality of nozzles configured to dispense fluid and the shower head is configured to be removably fluidly coupled to the diverter unit. The (Continued)

hand shower includes a second plurality of nozzles configured to dispense fluid and fluidly coupled by a hose to the diverter unit and the hand shower is configured to be removably attachable to the diverter unit by a connector.

12 Claims, 25 Drawing Sheets

Related U.S. Application Data

(60) Provisional application No. 62/443,995, filed on Jan. 9, 2017.

(51) Int. Cl.
*B05B 15/62* (2018.01)
*E03C 1/04* (2006.01)

(58) Field of Classification Search
CPC ..... B05B 15/60; B05B 1/1627; B05B 1/1636; B05B 1/1609; B05B 1/1618; B05B 1/1681; B05B 1/18–185; B05B 15/652; E03C 1/0408; E03C 1/0409; E03C 1/0405; E03C 1/023; E03C 1/0404; E03C 2001/0414
USPC ...................................... 239/443; 4/601, 605
See application file for complete search history.

(56) References Cited

U.S. PATENT DOCUMENTS

| | | | | |
|---|---|---|---|---|
| 7,360,723 | B2 | 4/2008 | Lev | |
| 7,665,676 | B2 | 2/2010 | Lev | |
| D621,905 | S | 8/2010 | Yoo | |
| 8,066,204 | B2 | 11/2011 | Petrovic | |
| D674,039 | S | 1/2013 | Chibitty | |
| D674,041 | S | 1/2013 | Hanus | |
| D674,042 | S | 1/2013 | Hanus | |
| 8,720,799 | B2 | 5/2014 | Tseng | |
| 8,919,379 | B2 | 12/2014 | Zhou et al. | |
| 9,438,977 | B2 * | 9/2016 | Wang | B05B 15/62 |
| D819,168 | S | 5/2018 | Reinecker | |
| D820,949 | S | 6/2018 | Reinecker | |
| D821,542 | S | 6/2018 | Reinecker | |
| 2005/0098661 | A1 * | 5/2005 | Lev | E03C 1/0404 239/549 |
| 2007/0272770 | A1 | 11/2007 | Leber | |
| 2009/0007330 | A1 | 1/2009 | Genord et al. | |
| 2012/0031515 | A1 | 2/2012 | Whitaker | |
| 2013/0299608 | A1 | 11/2013 | Spangler et al. | |
| 2014/0054398 | A1 * | 2/2014 | Lev | E03C 1/0409 239/443 |
| 2014/0250586 | A1 | 9/2014 | Zhadanov | |
| 2015/0115064 | A1 | 4/2015 | Wu et al. | |
| 2017/0128960 | A1 * | 5/2017 | D'Urso | B05B 1/18 |
| 2018/0104707 | A1 * | 4/2018 | Lin | B05B 1/1609 |

FOREIGN PATENT DOCUMENTS

| | | | | | |
|---|---|---|---|---|---|
| CN | 201088942 | Y | | 7/2008 | |
| CN | 101862713 | A | | 10/2010 | |
| CN | 104148202 | A | | 11/2014 | |
| CN | 104475279 | A | | 4/2015 | |
| CN | 205413398 | U | | 8/2016 | |
| CN | 106076677 | A | * | 11/2016 | B05B 1/1609 |
| CN | 106111367 | A | | 11/2016 | |
| CN | 106140504 | A | | 11/2016 | |
| EP | 0810034 | A2 | | 9/1998 | |
| EP | 1799606 | B1 | | 7/2011 | |
| GB | 2081607 | A | * | 2/1982 | B05B 1/1636 |
| JP | 1605043 | S | | 5/2018 | |
| WO | 2012/050894 | A1 | | 4/2012 | |

OTHER PUBLICATIONS

Decision to Grant a Design mailed Apr. 6, 2018, directed to JP Application No. 2017-014861; 6 pages.
Decision to Grant a Design mailed Jul. 20, 2018, directed to JP Application No. 2017-014862; 6 pages.
Decision to Grant a Design mailed Jul. 20, 2018, directed to JP Application No. 2017-014863; 6 pages.
Examiner's Report dated Jan. 9, 2018, directed to CA Application No. 175815; 1 page.
Examiner's Report dated Jan. 9, 2018, directed to CA Application No. 175817; 1 page.
Examiner's Report dated May 14, 2018, directed to CA Application No. 175815; 1 page.
Examiner's Report dated May 14, 2018, directed to CA Application No. 175817; 1 page.
Examiner's Report dated Jan. 9, 2018, directed to CA Application No. 175816; 1 page.
Examiner's Report dated May 14, 2018, directed to CA Application No. 175816; 1 page.
First Office Action dated Oct. 26, 2017, directed to CN Application No. 201730295988.3; 2 pages.
First Rectification Notification dated Oct. 26, 2017, directed to CN Application No. 201730295976.0; 2 pages.
International Search Report and Written Opinion mailed Apr. 30, 2018, directed to International Application No. PCT/US2018/012827; 12 pages.
K+BB. (Jun. 2007). "What's Cool Everywhere Else," Kitchen & Bath Business 6(54):70.
L'henaff et al., Office Action dated Apr. 2, 2021, directed to U.S. Appl. No. 15/865,096; 14 pages.
L'henaff et al., U.S. Office Action mailed Jun. 17, 2020, directed to U.S. Appl. No. 15/865,096; 15 pages.
L'henaff et al., U.S. Office Action mailed May 13, 2019, directed to U.S. Appl. No. 15/865,096; 13 pages.
L'henaff et al., U.S. Office Action mailed Nov. 18, 2019, directed to U.S. Appl. No. 15/865,096; 14 pages.
L'henaff et al., U.S. Office Action mailed Oct. 13, 2021, directed to U.S. Appl. No. 15/865,096; 13 pages.
Notice of Allowance dated Oct. 22, 2018, directed to MX Application No. MX/f/2017/002007; 5 pages.
Notice of Allowance dated Oct. 22, 2018, directed to MX Application No. MX/f2017/002006; 5 pages.
Notification to Grant Patent Right dated Jan. 16, 2018, directed to CN Application No. 201730295988.3; 6 pages.
Notification to Grant Patent Right dated May 22, 2018, directed to CN Application No. 201730295976.0; 6 pages.
Office Action dated Jul. 24, 2018, directed to BR Application No. 30 2017 002786-5; 2 pages.
Office Action dated Jul. 3, 2018, directed to BR Application No. 30 2017 002767-9; 2 pages.
Office Action dated May 22, 2018, directed to BR Application No. 30 2017 002777-6; 2 pages.
Office Action mailed Apr. 6, 2018, directed to JP Application No. 2017-014862; 3 pages.
Office Action mailed Apr. 6, 2018, directed to JP Application No. 2017-014863; 3 pages.
Second Office Action dated Jan. 15, 2018, directed to CN Application No. 201730295976.0; 2 pages.

* cited by examiner

SHOWER SYSTEM

CROSS-REFERENCE TO RELATED APPLICATIONS

This application is a continuation of U.S. patent application Ser. No. 15/865,096, filed Jan. 8, 2018, which claims the benefit of U.S. Provisional Application No. 62/443,995, filed Jan. 9, 2017, the entire contents of each of which are hereby incorporated by reference herein.

FIELD OF THE INVENTION

The present disclosure relates generally to shower systems.

BACKGROUND OF THE INVENTION

Shower assemblies, which provide water flow to a user in a shower, bathtub, or the like, are generally known. Some assemblies include multiple water delivery devices, including a shower head and a separate hand shower that the user may freely move. It is also known to removably mount the hand shower to the shower assembly (or elsewhere in the shower area). It is desirable, however, to provide additional shower assembly constructions.

SUMMARY OF THE INVENTION

Generally speaking, it is an object of the present disclosure to describe embodiments of a new shower system that include modular components that can be removably attached and may be replaced or interchanged with corresponding components having different form factor or design. In particular, the shower system includes a shower head, a diverter unit, and a hand shower. The shower head can be both fluidly coupled and removably attached to the diverter unit. The shower head includes a spray face defined with an opening shaped to receive a correspondingly shaped front portion of the diverter unit when the shower head is attached to the diverter unit. The hand shower is also fluidly coupled to the diverter unit, and is removably attached to the front portion of the diverter unit such that the hand shower is not flush with respect to either of the diverter unit and the shower head spray face when attached. In some embodiments, the diverter unit includes a paddle lever for selectively directly water flow to the shower head and the hand shower. The paddle lever may be positioned proximate the shower head for easy user access.

Still other objects and advantages of the present invention will in part be obvious and will in part be apparent from the disclosure.

In some embodiments, a shower assembly includes: a diverter unit fluidly coupled to a fluid source, the diverter unit configured to selectively direct flow of fluid from the fluid source to one or both of a shower head and a hand shower; the shower head including a first plurality of nozzles configured to dispense fluid, the shower head being configured to be removably fluidly coupled to the diverter unit; and the hand shower includes a second plurality of nozzles configured to dispense fluid and fluidly coupled by a hose to the diverter unit, the hand shower being configured to be removably attachable to the diverter unit by a connector.

In some embodiments, a spray head portion of the hand shower sits proud with respect to the shower head and the diverter unit when the hand shower is attached to the diverter unit.

In some embodiments, the shower assembly includes a release mechanism removably attaching the shower head to the diverter unit and the release mechanism is configured to be capable of being actuated to detach the shower head from the diverter unit. In some embodiments, the release mechanism includes a push button.

In some embodiments, the shower head is configured to fluidly couple to the diverter unit by coupling one or more waterways of the shower head to one or more corresponding channels of the diverter unit.

In some embodiments, the shower head is configured to fluidly couple to the diverter unit by coupling two waterways of the shower head to two corresponding channels of the diverter unit.

In some embodiments, the shower head includes an opening shaped to permit a correspondingly shaped front portion of the diverter unit to extend through the opening when the shower head is fluidly coupled to the diverter unit, and the opening enables a front surface of the diverter unit to be exposed for removably attaching to the hand shower.

In some embodiments, the shower assembly includes a paddle lever configured to be able to be actuated between a plurality of positions to cause the diverter unit to selectively direct flow of fluid from the fluid supply to one or both of the shower head and the hand shower. In some embodiments, when the paddle lever is actuated in a first position of the plurality of positions, the diverter unit is configured to selectively direct flow of fluid from the fluid source to the hand shower and the shower head. In some embodiments, when the paddle lever is actuated in a second position of the plurality of positions, the diverter unit is configured to selectively direct flow of fluid from the fluid source to the hand shower and not the shower head. In some embodiments, the paddle lever is attached to the diverter and configured to extend underneath the shower head.

In some embodiments, the hand shower includes a button that is configured to control a spray mode of the second plurality of nozzles.

In some embodiments, the diverter unit includes the connector.

In some embodiments, the hand shower includes the connector.

In some embodiments, the connector includes prongs. In some embodiments, the prongs include a pair of arms that extend outwardly from the diverter unit.

In some embodiments, the connector includes magnetically attractive material. In some embodiments, the magnetically attractive material removably attaches the hand shower to a front portion of the diverter unit.

BRIEF DESCRIPTION OF THE DRAWINGS

The present disclosure is discussed in greater detail below with reference to exemplary embodiments illustrated in the accompanying drawings, in which.

DETAILED DESCRIPTION OF THE INVENTION

Figure 1A:
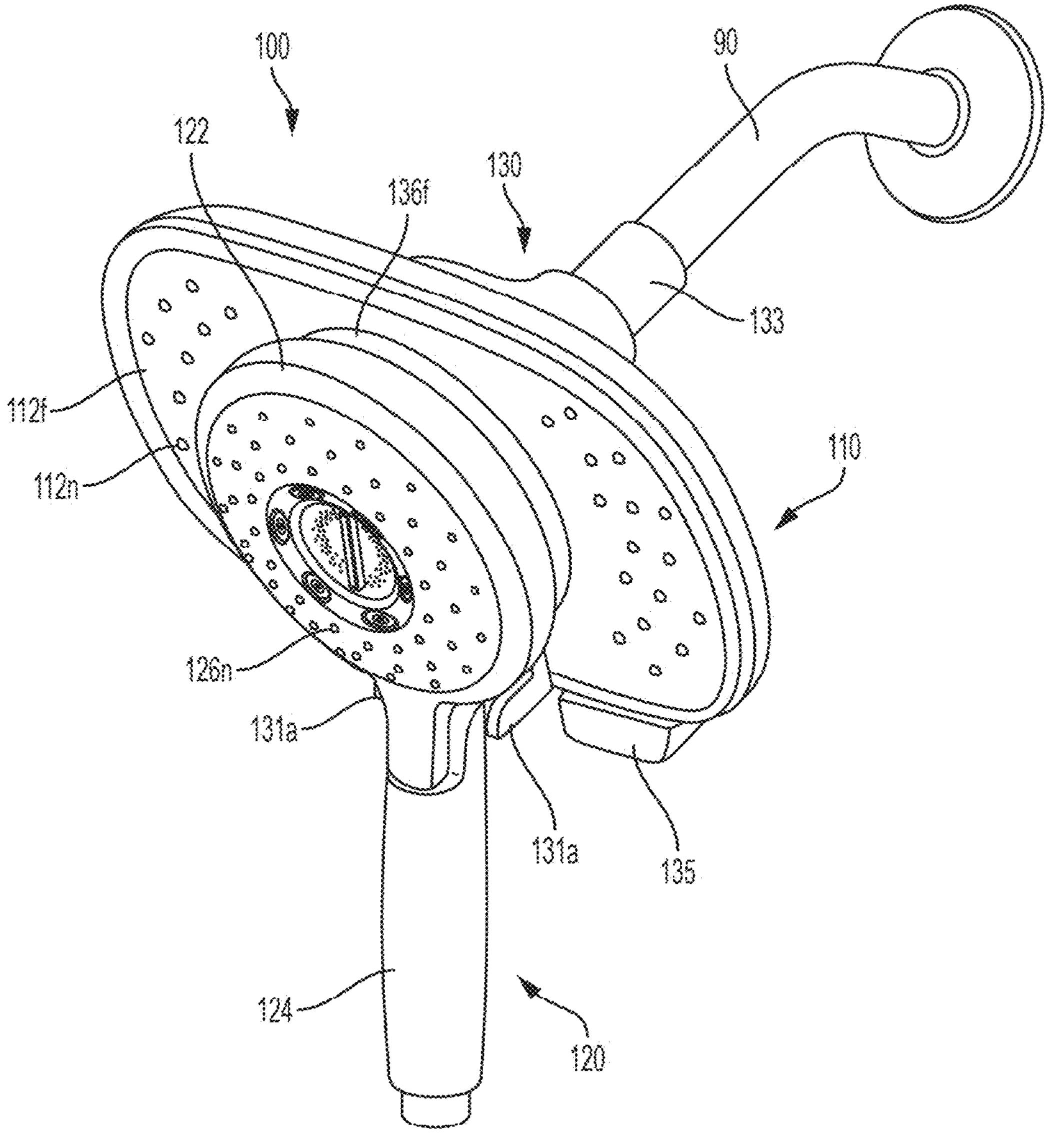
FIGS. 1A-B illustrate perspective views of a shower system, according to some embodiments.
Figure 1B:
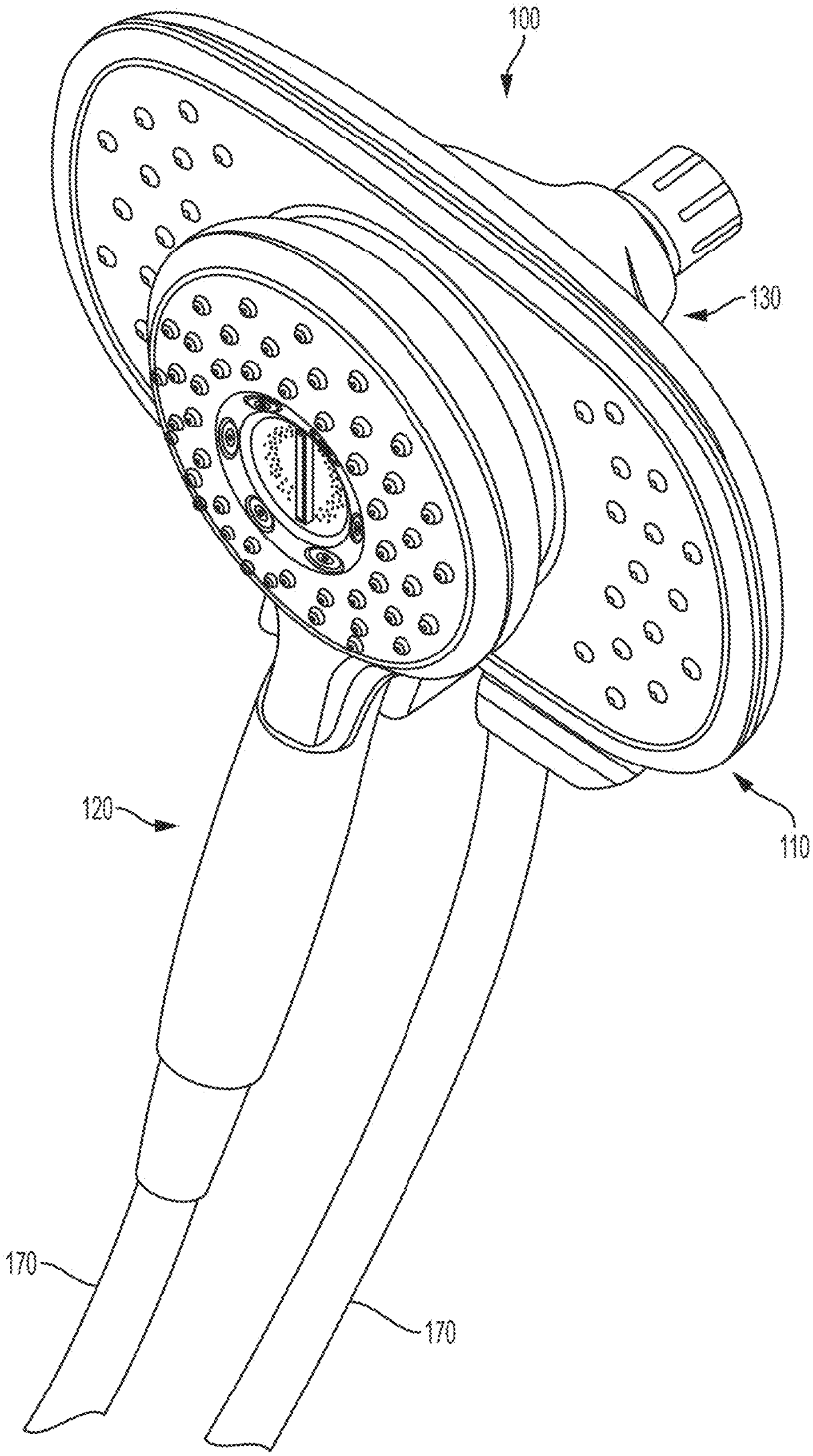
Figure 1C:
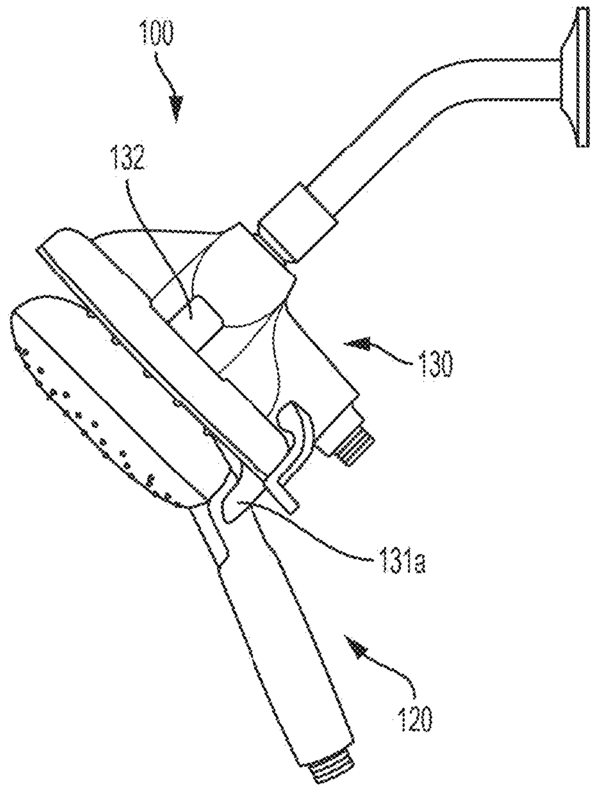
FIGS. 1C-D illustrate side views of the shower system, according to some embodiments.
Figure 1D:
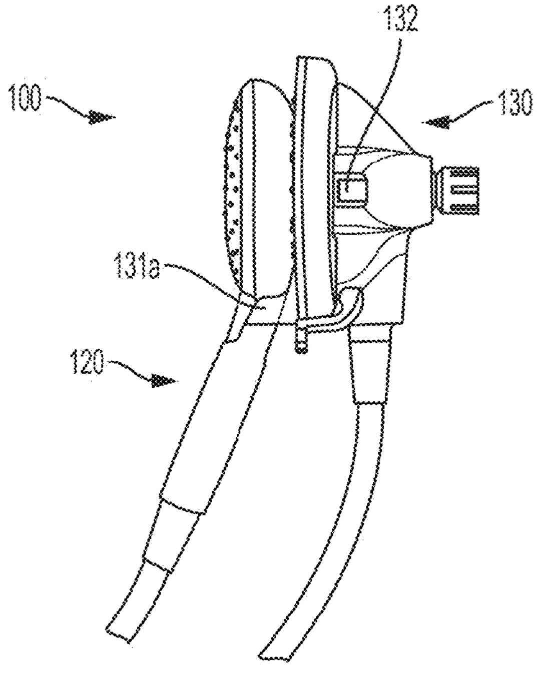

FIGS. 1A-D illustrate various views of a shower system 100, according to some embodiments of the present disclosure. In particular, FIGS. 1A-B illustrate perspective views of shower system 100, and FIGS. 1C-D illustrate side views of shower system 100. Shower system 100 can include a shower head 110, a diverter unit 130, and a hand shower 120. FIGS. 1A-D show a configuration of shower system 100 where shower head 110 and hand shower 120 are each removably attached to diverter unit 130. As will be further described below, the modular design of shower system 100 improves upon standard shower assemblies by providing a user with removably-attachable components that can be flexibly swapped to suit the user's preferences, according to some embodiments.

In some embodiment, diverter unit 130 includes a ball joint 133 disposed at a rear inlet of diverter unit 130 to fluidly couple diverter unit 130 to a water outlet tube 90 for receiving fluid (e.g., water, ozonated water, filtered water, etc.) from a fluid source (e.g., water source). Though the present disclosure generally describes embodiments with respect to water, it is to be understood that other types of fluids may be applicable to shower assemblies. For example, the fluid may be a cleaning solution used to clean a bathtub or a shower stall. As will be further described with respect to FIGS. 12-15, diverter unit 130 includes one or more valves for controlling water flow from water outlet tube 90 to shower head 110 and hand shower 120. In some embodiments, diverter unit 130 can be configured to selectively direct water flow to one of hand shower 120 and shower head 110 or both removably-attachable components. In some embodiments, diverter unit 130 can be configured to direct water flow based on whether hand shower 120 is removably attached to diverter unit 130. For example, in a coupled configuration where hand shower 120 is removably attached to diverter unit 130, diverter unit 130 may be configured to selectively direct water flow from water outlet tube 90 through both hand shower 120 and shower head 110.

In some embodiments, diverter unit 130 may be operable via a paddle lever 135 to selectively direct water flow through hand shower 120, shower head 110, or both hand shower 120 and shower head 110. In some embodiments, paddle lever 135 can be configured to extend underneath shower head 110 for easy user access. Paddle lever 135 may be mechanically actuated by either the user, the act of removably attaching hand shower 120 to diverter unit 130, or a combination thereof. For example, the user may actuate paddle lever 135 by pressing on or lifting up paddle lever 135. In another example, the act of removably attaching hand shower 120 to diverter unit 130 may effectuate paddle lever 135. In some embodiments, paddle lever 135 can be physically connected to a rotational shaft that rotates clockwise or counterclockwise based on whether a pressing or lifting force is exerted on paddle lever 135. The direction (e.g., clockwise or counterclockwise) of the rotational shaft may direct diverter unit 130 to selectively direct water flow. In some embodiments, paddle lever 135 may include a spring whose state (e.g., compressed or expanded) may direct diverter unit 130 to selectively direct water flow.

In some embodiments, shower head 110 can have a wide, substantially flat spray face 112*f* including nozzles 112*n* for outputting water received through diverter unit 130, as described above. Shower head 110, which can be selected from a set of interchangeable shower heads with different footprints and/or nozzle configurations, removably attaches to diverter unit 130. As shown in FIG. 1A and as described below, shower head 110 being removably attached to diverter unit 130 also fluidly couples shower head 110 to diverter unit 130.

Providing removably-attachable shower heads (e.g., such as shower head 110) that are interchangeable allows a user greater flexibility in utility and design not afforded by shower assembly designs with an integrated shower head and diverter unit. For example, the user may select shower head 110 having a specific design (or form factor) that better conform to the surrounding décor. Additionally, the user may select shower head 110 with nozzles 112*n* of a specific configuration (e.g., a number of nozzles or nozzles of a specific diameter) to control water stream pressure of a shower head in shower system 100.

Shower head 110 can be removably attached to diverter unit 130 via one or more coupling mechanisms. In some embodiments, shower head 110 can be removably attached to diverter unit 130 via a release mechanism 132 (e.g., one or a pair of push buttons as shown in FIGS. 1C-D).

Figure 7:
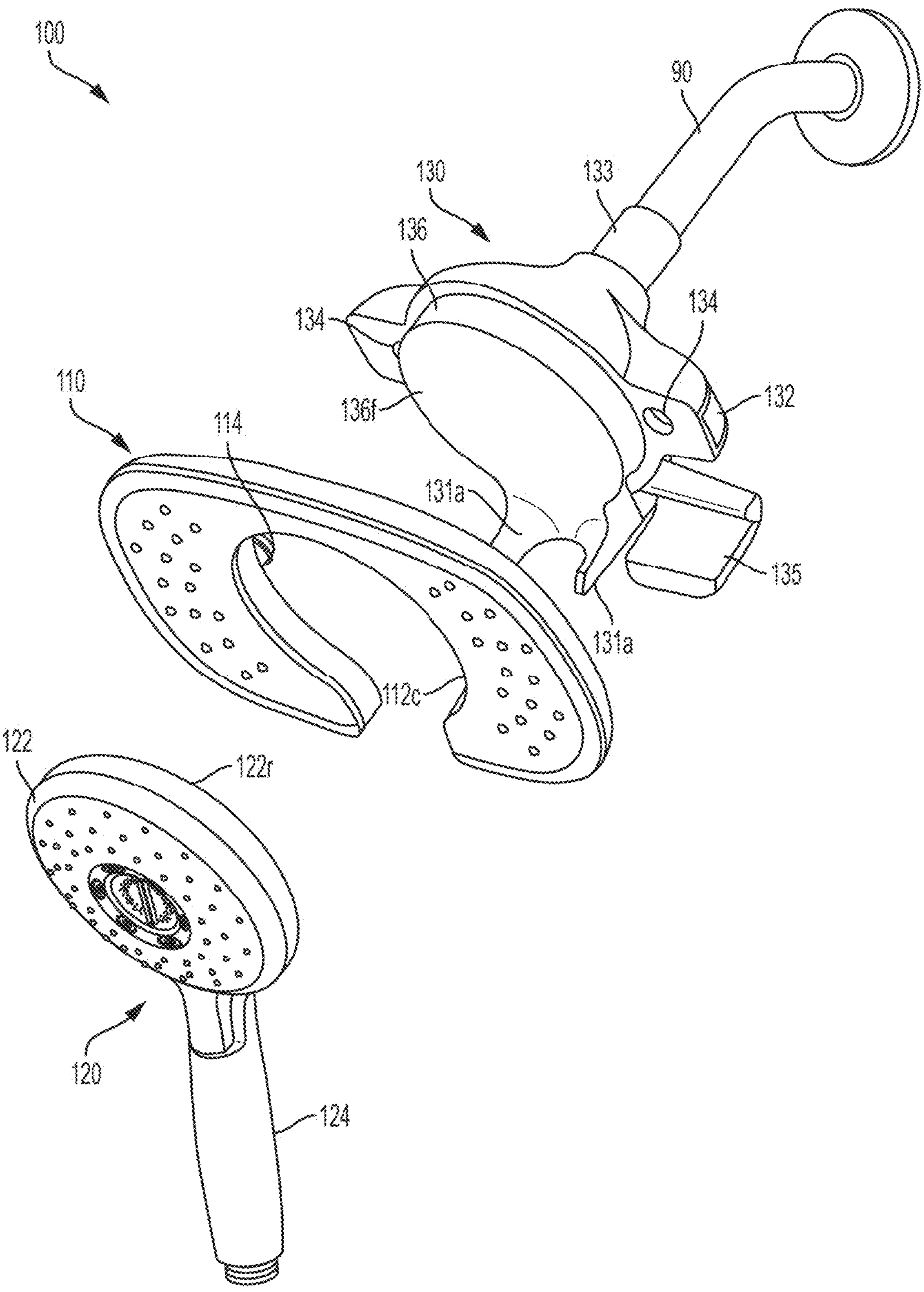
FIG. 7 illustrates removably-attached components of the shower system, according to some embodiments.
Figure 8:
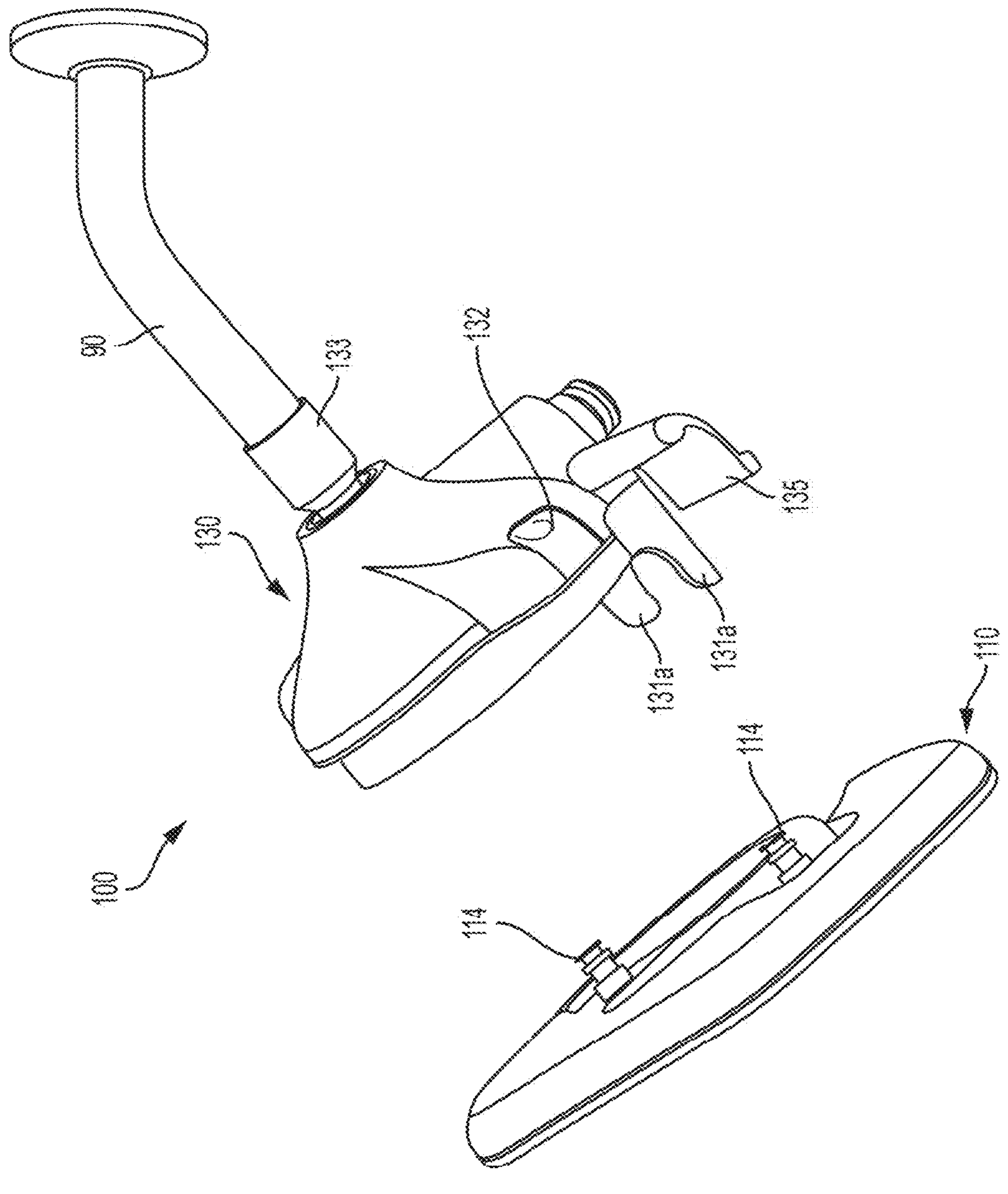
FIG. 8 illustrates another view of the shower system of FIG. 7, according to some embodiments.

In some embodiments, shower head 110 can be removably attached to diverter unit 130 by physically coupling one or more waterways of hand shower 120 with corresponding one or more channels of diverter unit 130, as will be further described with respect to FIGS. 7 and 8.

In some embodiments, shower head 110 can be removably attached to diverter unit 130 via a magnetic connection. For example, a back side of shower head 110 (as shown in FIG. 7) and front portion 136 (as shown in FIG. 7) may include one or more complementary magnets, or magnetically attractive material having complementary magnetic polarities. When the back side of shower head 110 is brought into contact with front surface 136, shower head 110 is removably attached to diverter unit 130 by the magnetic attractive force. The magnetic forces should be sufficient to enable shower head 110 to be capable of being safely removably attached (e.g., attached and detached) from diverter unit 130. Preferably, this is in compliance with all government and industry regulations and standards.

As shown in FIGS. 1A-D, hand shower 120 can include a spray head portion 122 for outputting water, a handle 124 for allowing the user to operate spray head portion 122, and a hose 170 for receiving water from diverter unit 130. Hose 170 can both fixedly attach and fluidly couple hand shower 120 to diverter unit 130. In some embodiments, hose 170 can be at least 59 inches (i.e., approximately 1.5 meters) to provide the user with a wide range of mobility in operating hand shower 120. In some embodiments, spray head portion 122 can include a nozzle unit 126 having nozzles 126*n* that fluidly couple hand shower 120 to hose 170.

In some embodiments, in addition to being fixedly attached to diverter unit 130 via hose 170, hand shower 120 can be removably attached to diverter unit 130 by a connector. In some embodiments, diverter unit 130 includes the connector. In some embodiments, hand shower 120 includes the connector. For example, FIGS. 1A-D illustrate views of a configuration of shower system 100 where hand shower 120 is removably attached (e.g., mounted or magnetically attached) to diverter unit 130. In some embodiments, hand shower 120 can be removably attached to diverter unit 130 to sit proud (i.e., extends from the surface) of the flat front surface 136*f* of diverter unit 130 and shower head 110. This configuration can provide the user another means by which to detach hand shower 120 from diverter unit 130. For example, because spray head portion is not flush with respect to flat front surface 136*f* or flat spray face 112*f*, the user may be permitted to easily grab spray head portion 122 itself to detach hand shower 120 from diverter unit 130.

In some embodiments, hand shower 120 can be removably attached to diverter unit 130 by docking removable spray head portion 122 with flat front surface 136*f* of diverter unit 130. In some embodiments, the connector can be magnets or magnetically attractive material. For example, spray head portion 122 can be docked to flat front surface 136*f* of diverter unit 130 via a magnetic connection. For example, a back side (e.g., back side 122*r* in FIG. 7) of spray head portion 122 and flat front surface 136*f* may include one or more complementary magnets, or magnetically attractive material having complementary magnetic polarities. When the back side of spray head portion 122 is brought into contact with flat front surface 136*f*, the back side is held in place by the magnetic attractive force such that hand shower 120 sits proud of diverter unit 130 and spray face 112*f* of shower head 110. The magnetic forces should be sufficient to safely and securely removably attach hand shower 120 to diverter unit 130 without requiring excessive pull force to undock hand shower 120. Preferably, this is in compliance with all government and industry regulations and standards.

In some embodiments, the connector for removably attaching hand shower 120 to diverter unit 130 can be prongs. For example, hand shower 120 can be removably attached to diverter unit 130 via a pair of arms 131*a* that extend outwardly from a bottom portion of diverter unit 130. In some embodiments, arms 131*a* can be configured to affix hand shower 120, particularly where handle 124 of hand shower 120 tapers to meet spray head portion 122, to diverter unit 130. In some embodiments, hand shower 120 can be removably attached to diverter unit 130 via magnetic docking, as described above, in addition to arms 131*a*. In these embodiments, arms 131*a* may prevent the magnetically docked hand shower from turning left or right or from sliding down.

Figure 2A:
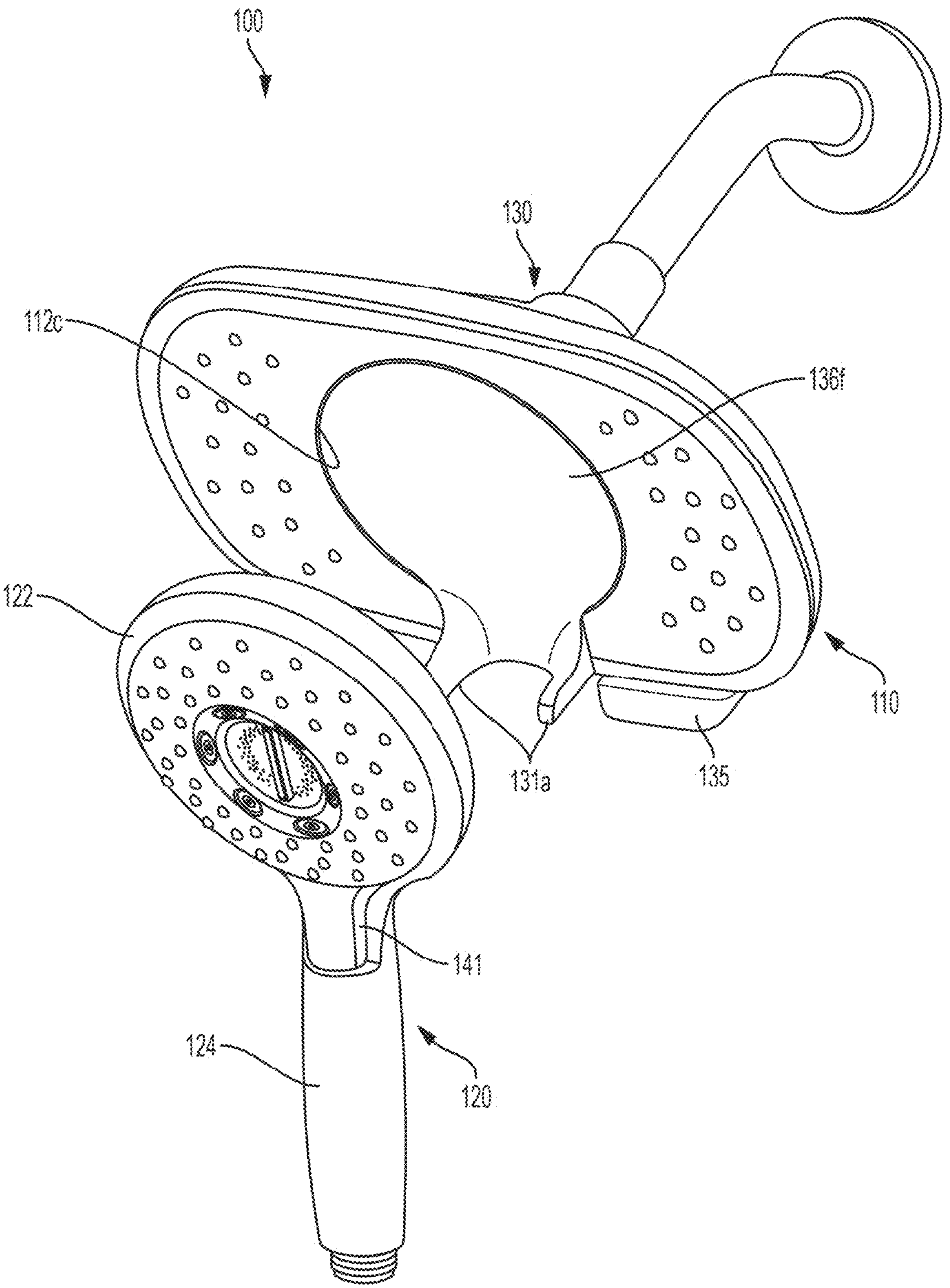
FIGS. 2A-B illustrate a hand shower removably attached to a diverter unit in the shower system, according to some embodiments.
Figure 2B:
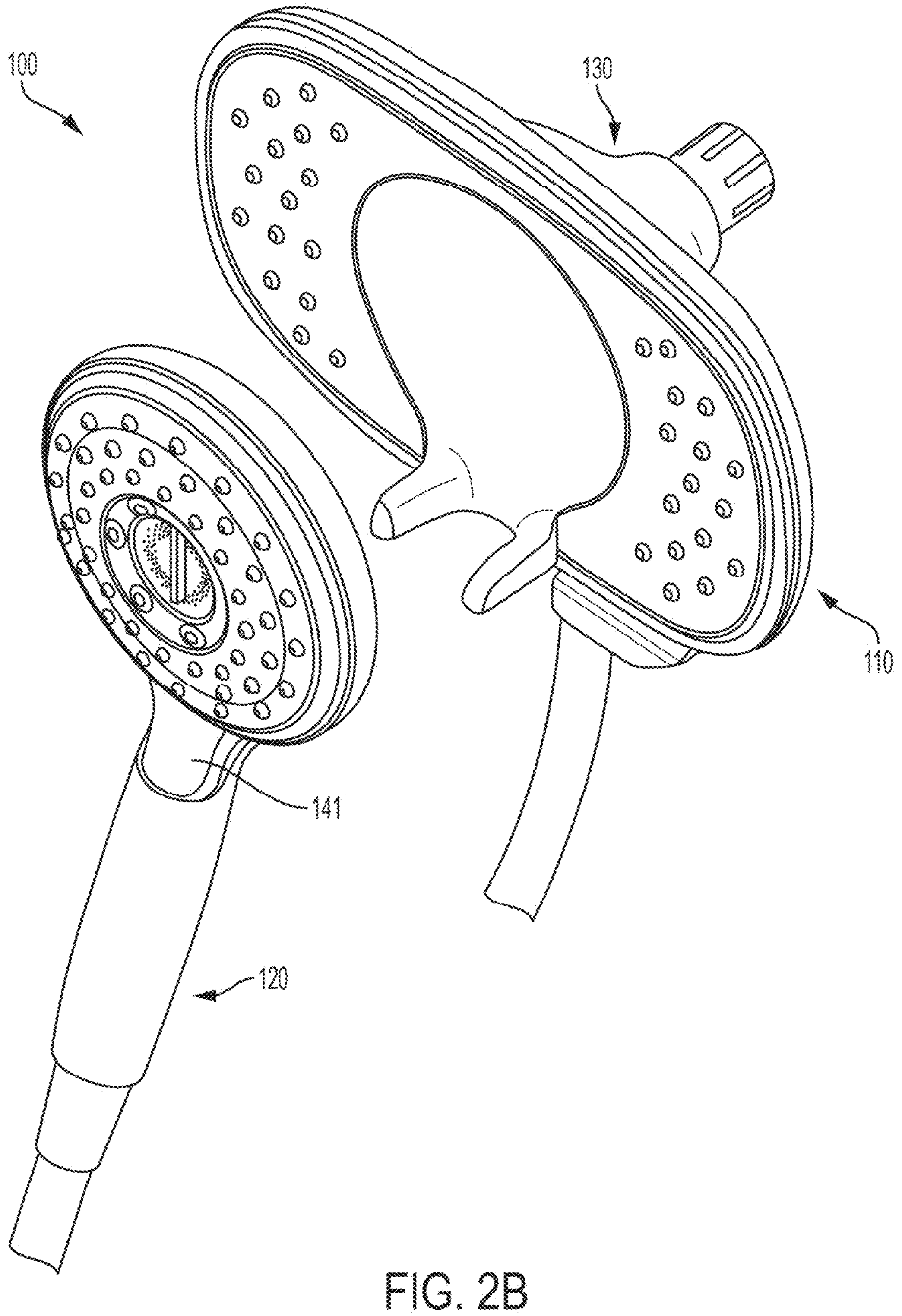

FIGS. 2A-B illustrate hand shower 120 removably attached to diverter unit 130 in shower system 100, according to some embodiments. In particular, FIGS. 2A-B show a configuration of shower system 100 where hand shower 120 is detached from diverter unit 130. Note that while spray head portion 122 of hand shower 120 is shown as being detached from diverter unit 130, hand shower 120 can remain both fixedly attached and fluidly coupled to diverter unit 130 through hose 170 (as shown in FIG. 1B). As described with respect to FIGS. 1A-D, diverter unit 130 can be configured to control water flow to shower head 110 and hand shower 120 based on whether hand shower 120 is removably attached to diverter unit 130. For example, when spray head portion 122 of hand shower 120 is detached from diverter unit 130, diverter unit 130 can be configured to simultaneously block water flow to shower head 110 and selectively direct water flow to hand shower 120.

In some embodiments, spray head portion 122 of hand shower 120 can be removably attached to flat front surface 136*f* of diverter unit 130. As shown in FIG. 2A, shower head 110 may have an opening 112*c* defined therein, which is shaped to permit a correspondingly shaped front portion 136 of diverter unit 130 to be received therein when shower head 110 is attached to diverter unit 130. As described with respect to FIGS. 1A-D, the user may detach hand shower 120 from diverter unit 130 by grabbing and pulling spray head portion 122 or pulling hand shower 120 via handle 124. Hand shower 120 may remain fluidly coupled to diverter unit 130 via hose 170 physically connecting hand shower 120 to diverter unit 130.

In some embodiments where hand shower 120 removably attaches to diverter unit 130 via a magnetic connection, grabbing handle 124 or spray head portion 122 and exercising a pulling force overcomes the magnetic force removably attaching spray head portion 122 to flat front surface 136*f* of diverter unit 130.

In some embodiments, the pair of arms 131*a* on the underside of diverter unit 130 can be implemented to hold hand shower 120 in place and removably attached to flat front surface 136*f* of diverter unit 130. In some embodiments, the pair of arms 131*a* can be angled upwards such that the user can detach hand shower 120 (e.g., spray head portion 122) from diverter unit 130 by grabbing, lifting, and pulling spray head portion 122 or handle 124 away from diverter unit 130. In some embodiments, the pair of arms 131*a* can be made from an elastic material (e.g., a plastic) that holds hand shower 120 in place via a squeezing force. In these embodiments, the user may be enabled to detach hand shower 120 from diverter unit 130 by directly pulling on hand shower 120 via handle 124 or spray head portion 122.

In some embodiments, hand shower 120 includes a button 141 that may be toggled by the user to change a spray mode of spray head portion 122. The spray mode may include, without limitation, a force of the water spray, a misting spray, a jet spray, a swirling massage spray, among other types of spray patterns etc. In some embodiments, to provide a plurality of spray modes, button 141 can be toggled to control a flow rate of water flowing through hose 170 to nozzles (e.g., nozzles 112*n*) of spray head portion 122. In some embodiments, to provide a plurality of spray modes, button 141 can be toggled to control which of nozzles of spray head portion 122 are permitted to operate.

In some embodiments, as described above with respect to FIGS. 1A-D, diverter unit 130 includes a paddle lever 135 capable of being actuated between a plurality of positions to cause diverter unit 130 to selectively direct fluid (e.g., water) to flow to shower head 110, hand shower 120, or both removably-attached components. In some embodiments, paddle lever 135 may include a spring that may compress or expand to permit paddle lever 135 to stay in a pushed up or pressed down configuration, respectively. In some embodiments, paddle lever 135 can be actuated by the user by pressing down on or lifting up paddle lever 135. In some embodiments, paddle lever 135 may be configured to operate based on a state of arms 131*a*. For example, paddle lever 135 may be pressed down when force is exerted on the pair of arms 131*a* (e.g., when hand shower 120 is removably attached to diverter unit 130) and be released when the force is lessened (e.g., when hand shower 120 is detached from diverter unit 130). Accordingly, paddle lever 135 may operate based on whether hand shower 120 is removably attached to diverter unit 130, according to some embodiments.

Figure 3:
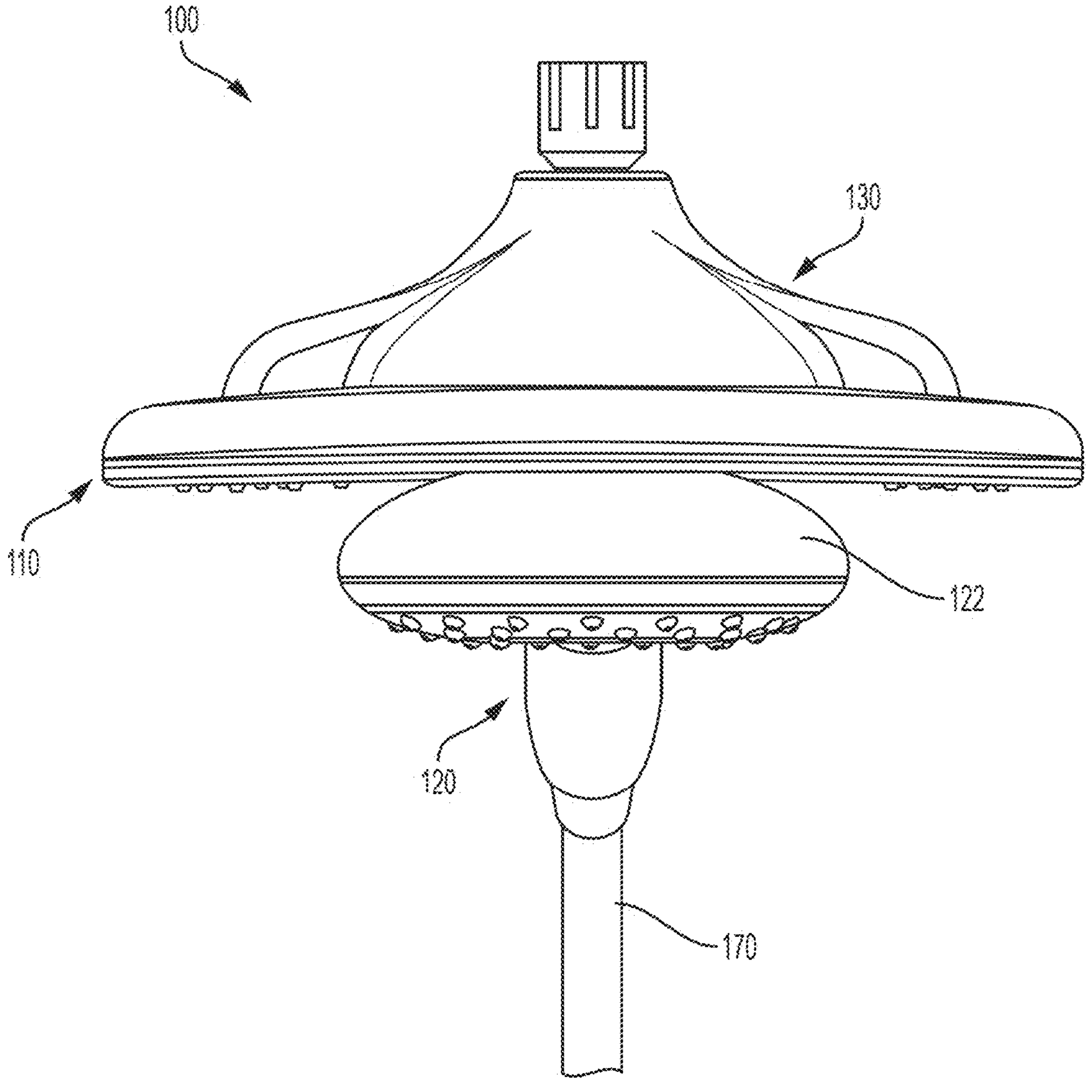
FIGS. 3-6 illustrate various views of the shower system, according to some embodiments.
Figure 4:
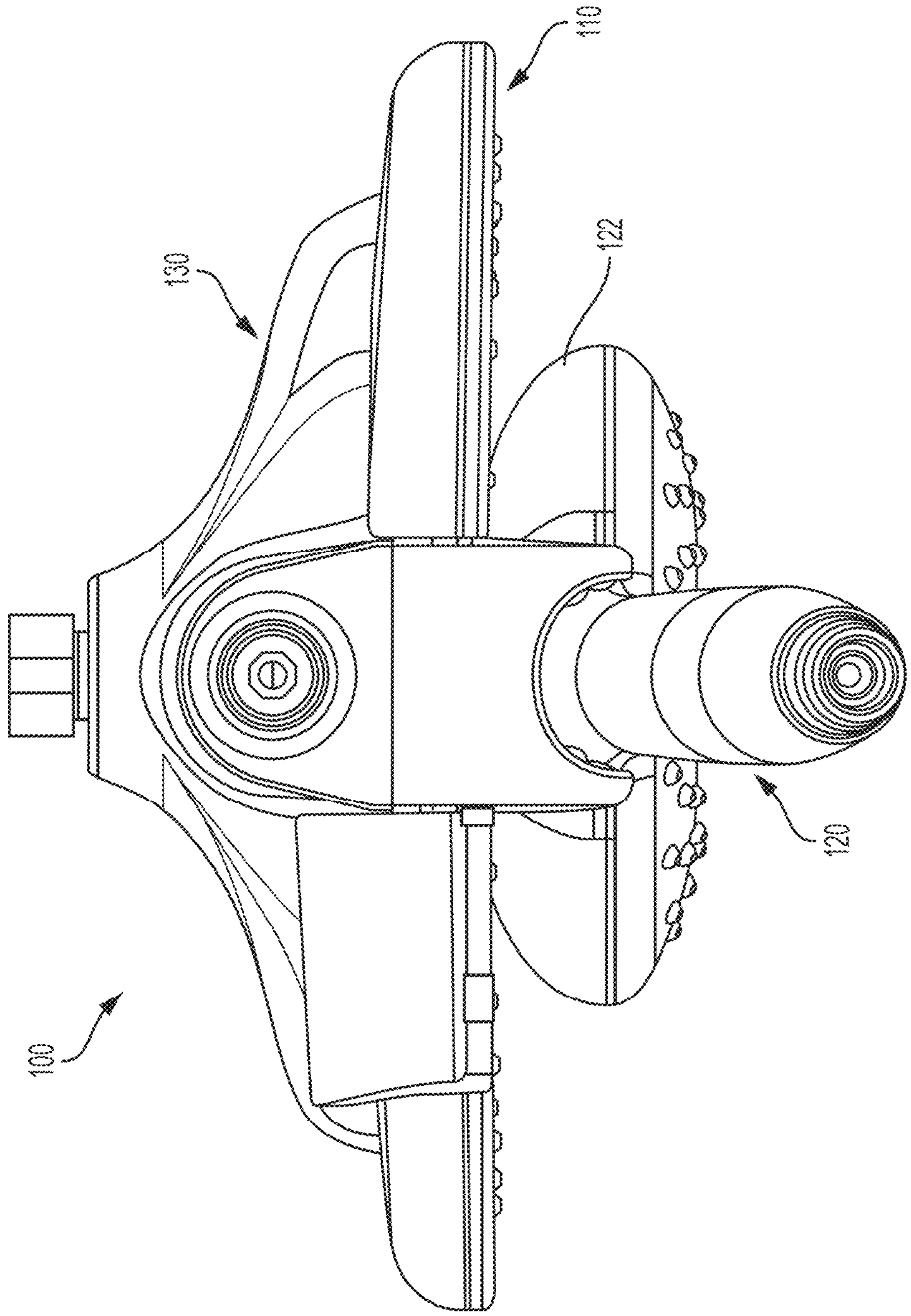
Figure 5:
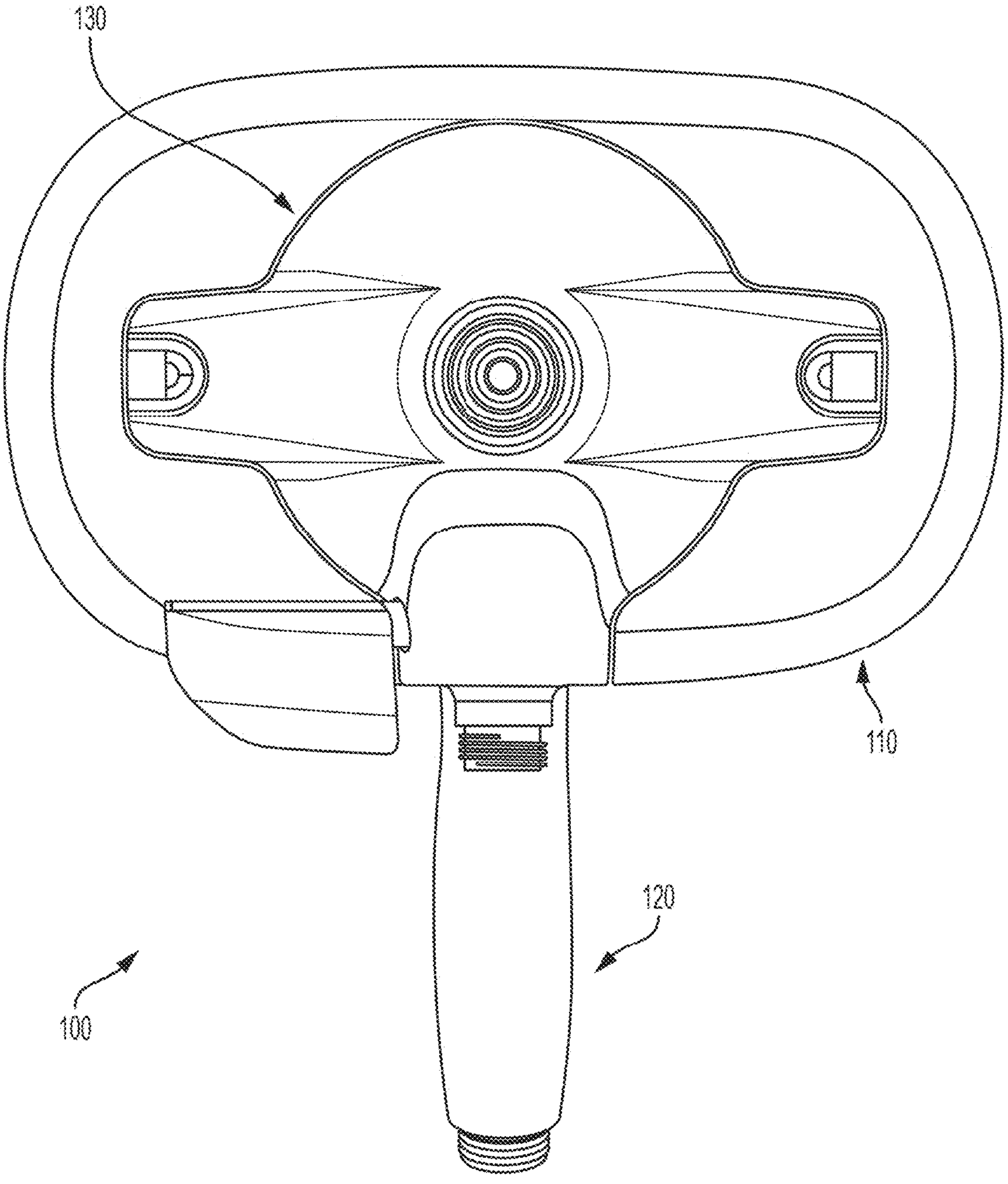

FIGS. 3-6 illustrate various views of shower system 100, as described with respect to FIGS. 1A-D and 2A-B, according to some embodiments. FIGS. 3-6 illustrate shower system 100 in a coupled configuration where both removably-attachable components of hand shower 120 and shower head 110 are each removably attached to diverter unit 130. As shown in FIGS. 3-4, spray head portion 122 of hand shower 120 sits proud of shower head 110 and diverter unit 130 when hand shower 120 is attached to diverter unit 130. In some embodiments, a portion of spray head portion 122 of hand shower 120 may jut out from shower head 110 to provide an additional surface for the user to grab onto to detach hand shower 120 from diverter unit 130.

Figure 6:
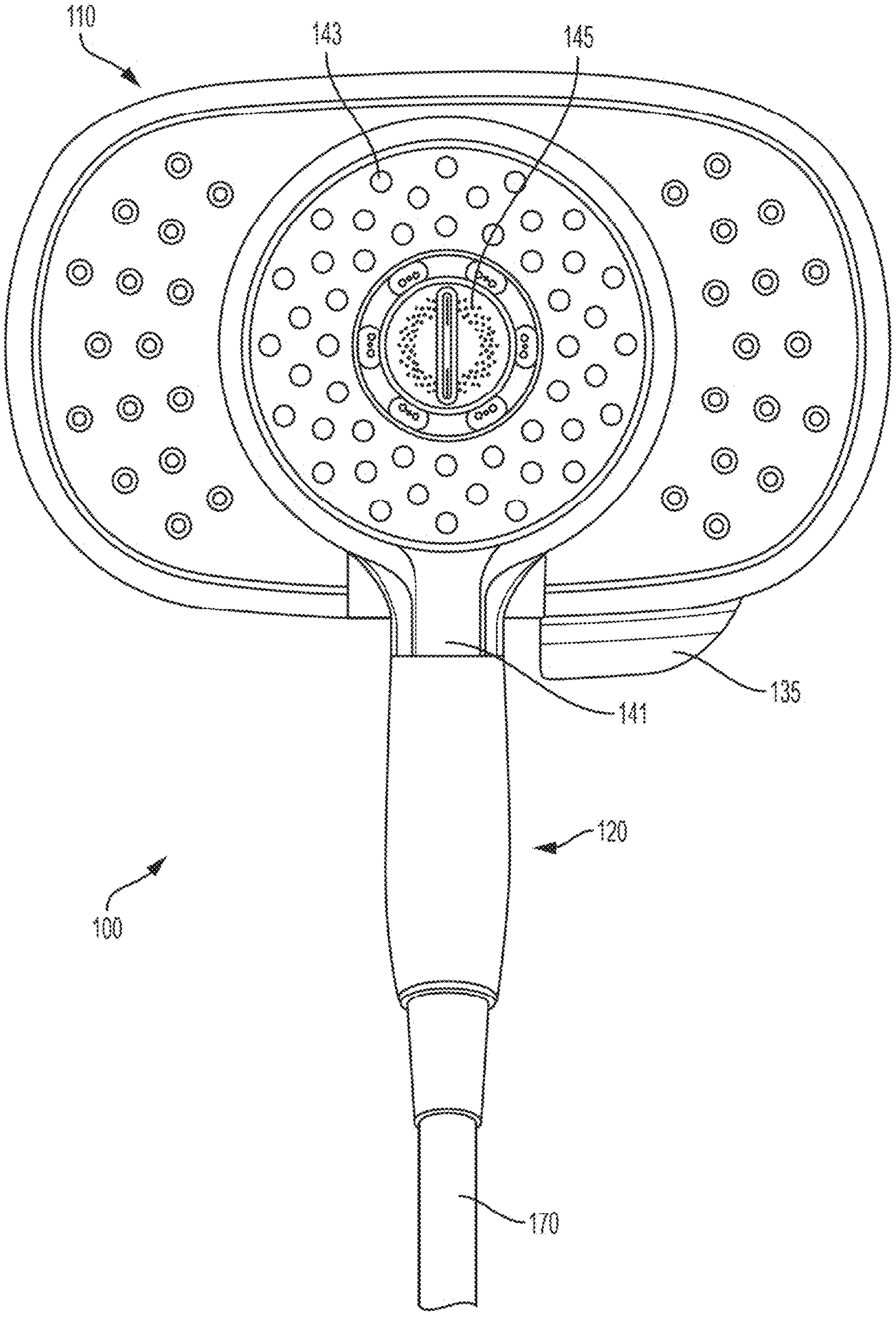

FIG. 6 further illustrates hand shower 120 including button 141 to control a spray mode of hand shower 120, as described with respect to FIGS. 2A-B. For example, by pressing on button 141, the user can control a number of or a type of nozzles (e.g., nozzles of type 143 or nozzles of type 145) to output water to enable different spray modes.

FIG. 7 illustrates removably-attached components of shower system 100, according to some embodiments. Shower system 100 is capable of being flexibly tailored to the user's needs by including modular components: hand shower 120 and shower head 110 that each can be removably-attached to diverter unit 130. As shown in FIG. 7, a ball joint 133 disposed at a rear inlet of diverter unit 130 can fluidly couple diverter unit 130 to a water outlet tube 90. Water outlet tube 90 may be further fluidly coupled to a water source. As will be further described with respect to FIGS. 12-15, diverter unit 130 includes a paddle lever 135 that can be operated to selectively control whether water (or other fluids) from water outlet tube 90 can be permitted to flow to shower head 110, hand shower 120, or both shower head 110 and hand shower 120.

In some embodiments, shower head 110 can be fluidly coupled to diverter unit 130 via one or more waterways 114 that interoperate with one or more corresponding channels 134 of diverter unit 130. In some embodiments, shower head 110 can be removably attached to diverter unit 130 by coupling the one or more waterways 114 with corresponding one or more channels 134 of diverter unit 130. In these embodiments, the act of coupling the one or more waterways 114 also fluidly couples shower head 110 with diverter unit 130.

In some embodiments, shower head 110 can be removably attached to diverter unit 130 via one or more release mechanisms 132. For example, release mechanisms 132 may be one or more push buttons (e.g., a pair of push buttons) that mechanically and physically attaches shower head 110 to diverter unit 130. When the one or more push buttons are pressed, shower head 110 may be capable of detaching from diverter unit 130.

In some embodiments, providing a removably-attachable shower head 110 within shower system 100 may enable the user to select a shower head 110 from a plurality of shower heads to select a shower head design that best fits his or her needs. In some embodiments, each of the shower heads (including shower head 110) from the plurality of shower heads may have an opening 112*c* that is shaped to permit a correspondingly shaped front portion 136 of diverter unit 130 to be received therein when shower head 110 is attached to diverter unit 130.

In some embodiments, opening 112*c* of shower head 110 can be shaped to permit a back side 122*r* of spray head portion 122 to couple to a flat front surface 136*f* of front portion 136 to enable a secure, but detachable attachment between hand shower 120 and diverter unit 130. In effect, opening 112*c* enables flat front surface 136*f* of front portion 136 to be exposed when shower head 110 is attached to diverter unit 130. As described above with respect to FIGS. 1A-D, the removable attachment between hand shower 120 and diverter unit 130 may be enabled by including complementary magnets within spray head portion 122 (of hand shower 120) and front surface 136 (of diverter unit 130). In some embodiments, the removable attachment may be enabled by a pair of arms 131*a* of diverter unit 130 that extends outwardly away from diverter unit 130. In these embodiments, the pair of arms 131*a* may affix hand shower 120, particularly the portion of hand shower 120 where handle 124 tapers to meet spray head portion 122.

FIG. 8 illustrates another view of shower system 100 of FIG. 7, according to some embodiments. As shown in FIG. 8, shower head 110 may include two waterways 114 for receiving water provided by water outlet tube 90 and selectively directed by diverter unit 130 towards shower head 110. In some embodiments where shower head 110 can be removably attached to diverter unit 130 via waterways 114, implementing two waterways 114 within shower head 110 can facilitate a more secure coupling between shower head 110 and diverter unit 130. In some embodiments, one or more waterways 114 of shower head 110 may both removably attach and fluid couple shower head 110 to diverter unit 130.

Figure 9B:
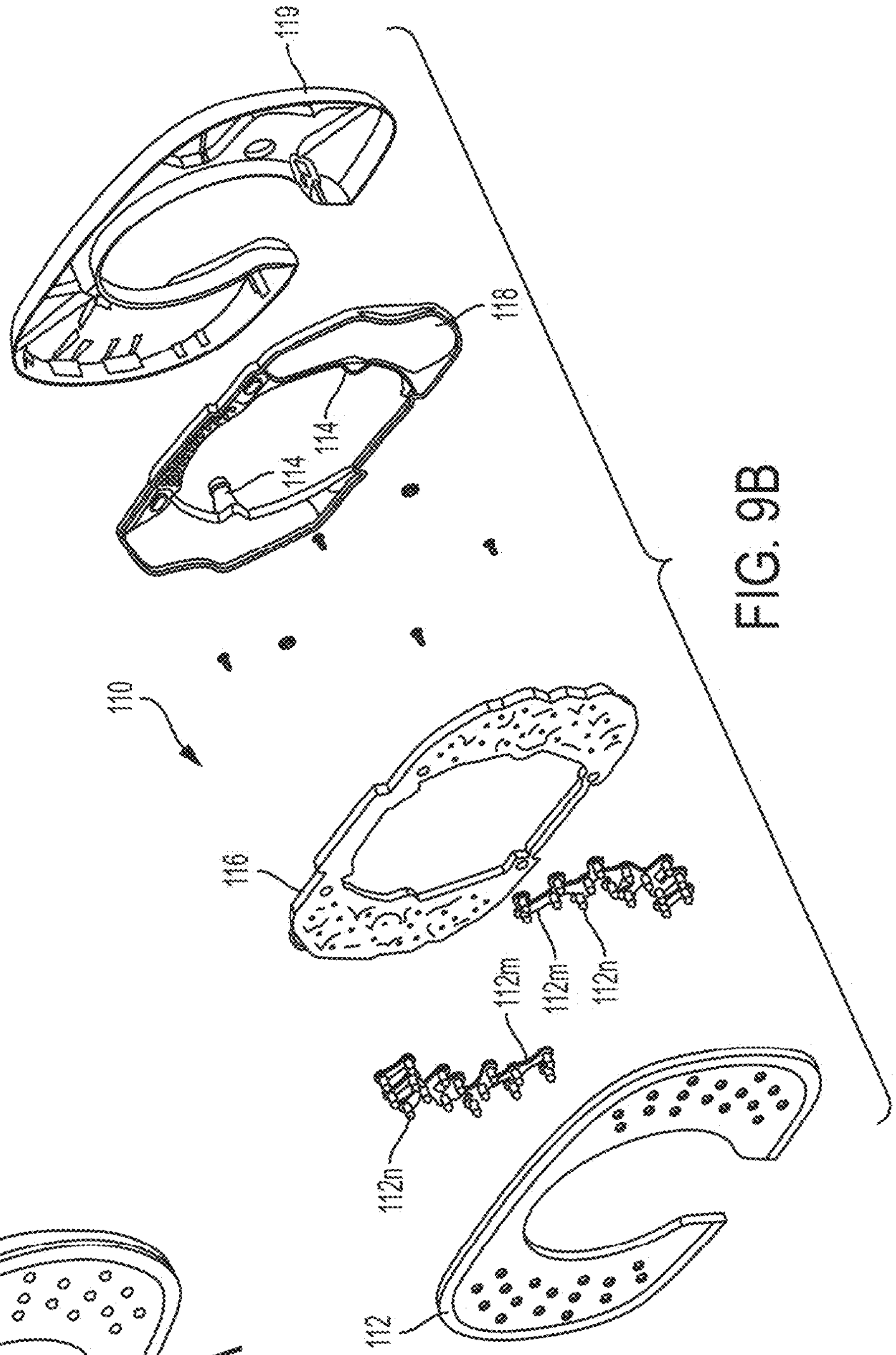
FIGS. 9A-B illustrate a shower head and its associated components, according to some embodiments.
Figure 9A:
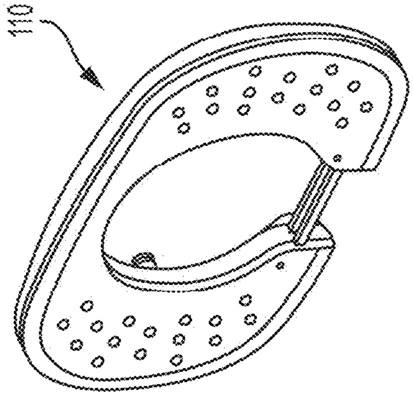

FIG. 9A illustrate a shower head 110 of shower system 100, as described above. FIG. 9B illustrate the various components that comprise shower head 110, according to some embodiments. As shown in the exploded view of shower head 110 in FIG. 9B, shower head 110 can include a faceplate 112 with openings through which nozzles 112*n* of nozzle units 112*m* are at least partially disposed. Shower head 110 can also include a retainer plate 116 that sandwiches nozzle units 112*m* with faceplate 112, a waterway plate 118 that includes one or more waterways 114, and a back cover 119. Back cover 119 may include holes through which one or more waterways 114 extend to permit shower head 110 to receive water from diverter unit 130, as described above.

Figure 10A:
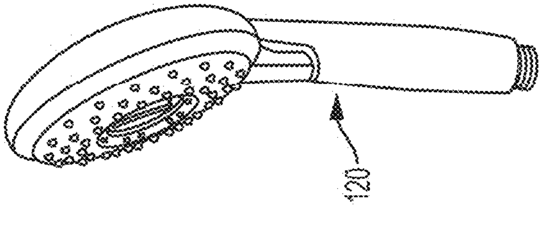
FIGS. 10A-B illustrate a hand shower and its associated components, according to some embodiments.
Figure 10B:
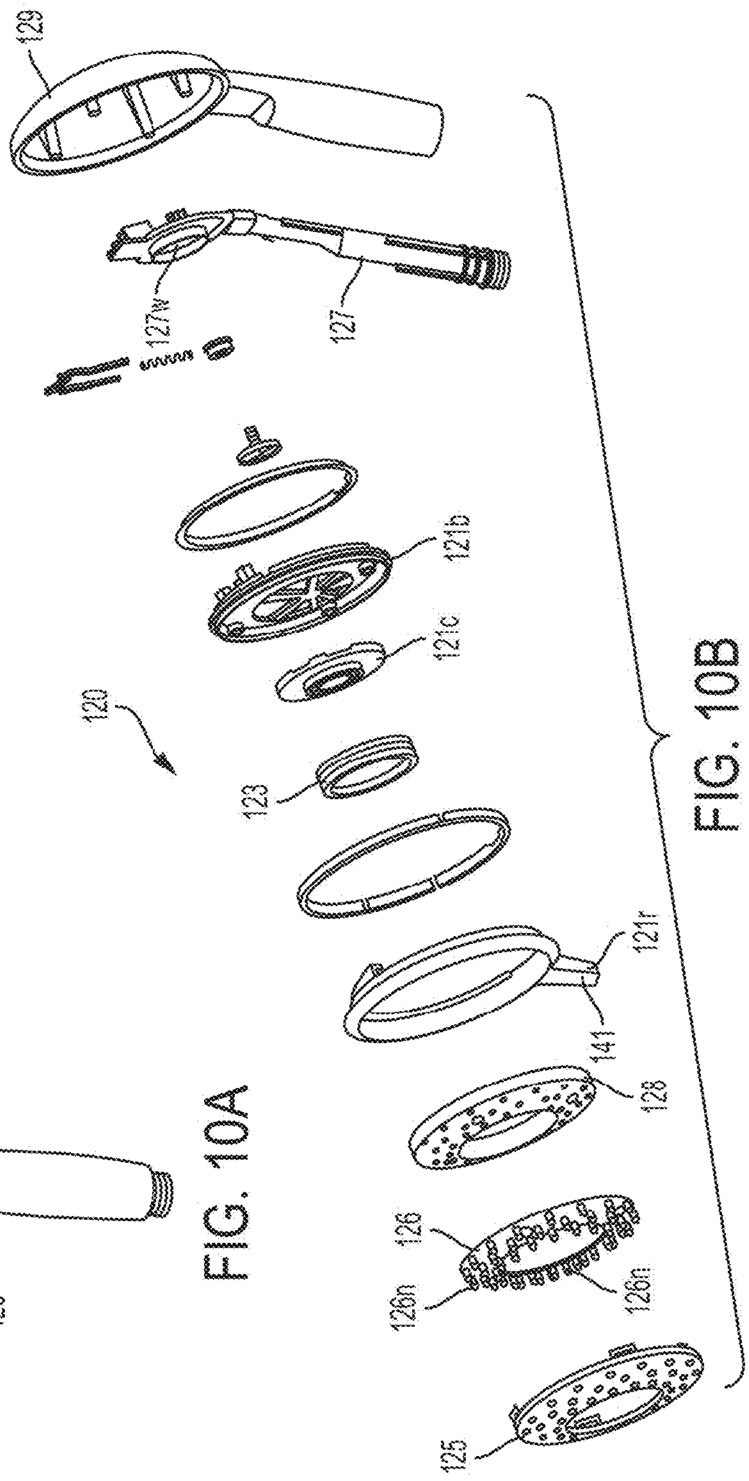

FIG. 10A illustrate a hand shower 120 of shower system 100, as described above. FIG. 10B illustrate the various components that comprise hand shower 120, according to some embodiments. As shown in the exploded view of hand shower 120 in FIG. 10B, hand shower 120 can include a nozzle unit 126 having nozzles 126*n* and a faceplate 125 through which nozzles 126*n* are disposed. Hand shower 120 can also include a nozzle plate 128 that sandwiches nozzle unit 126 with faceplate 125. Additionally, hand shower 120 can include a nozzle plate 128, a diverter ring 121*r*, massage or soft spray nozzle 123, a diverter cover plate 121*c*, a diverter base plate 121*b*, a waterway unit 127 having a waterway 127*w*, and a back cover 129.

In some embodiments, massage or soft spray nozzle 123 and nozzles 126*n* can be controlled by the user to access a spray mode from a plurality of spray modes of hand shower. For example, as described with respect to FIGS. 2A-B and 6, hand shower 120 can include a button 141 for controlling the spray mode. As shown in FIG. 10B, button 141 may be integrated within diverter ring 121*r*, according to some embodiments.

Figure 11A:
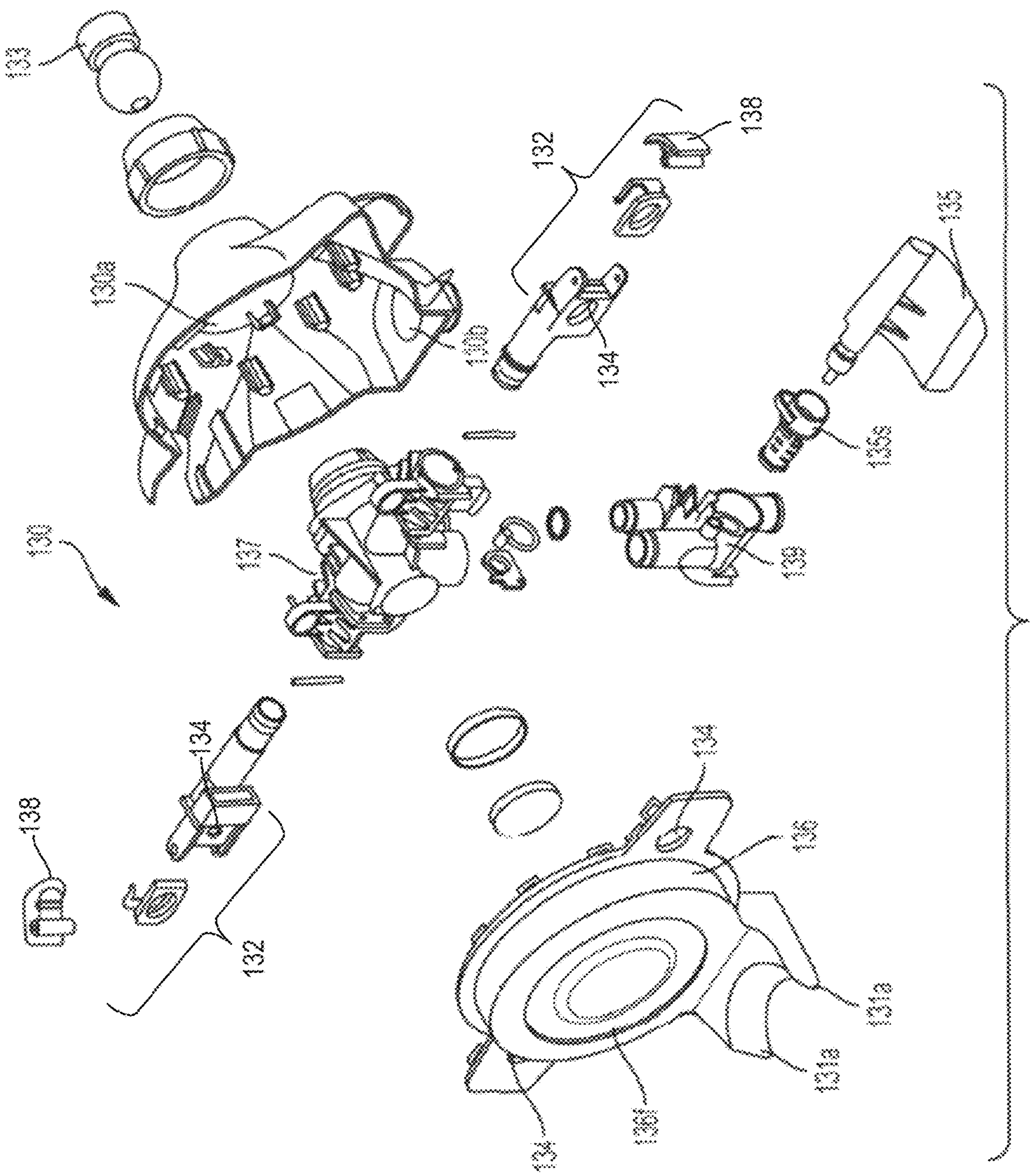
FIGS. 11A-B illustrate a diverter unit and its associated components, according to some embodiments.
Figure 11B:
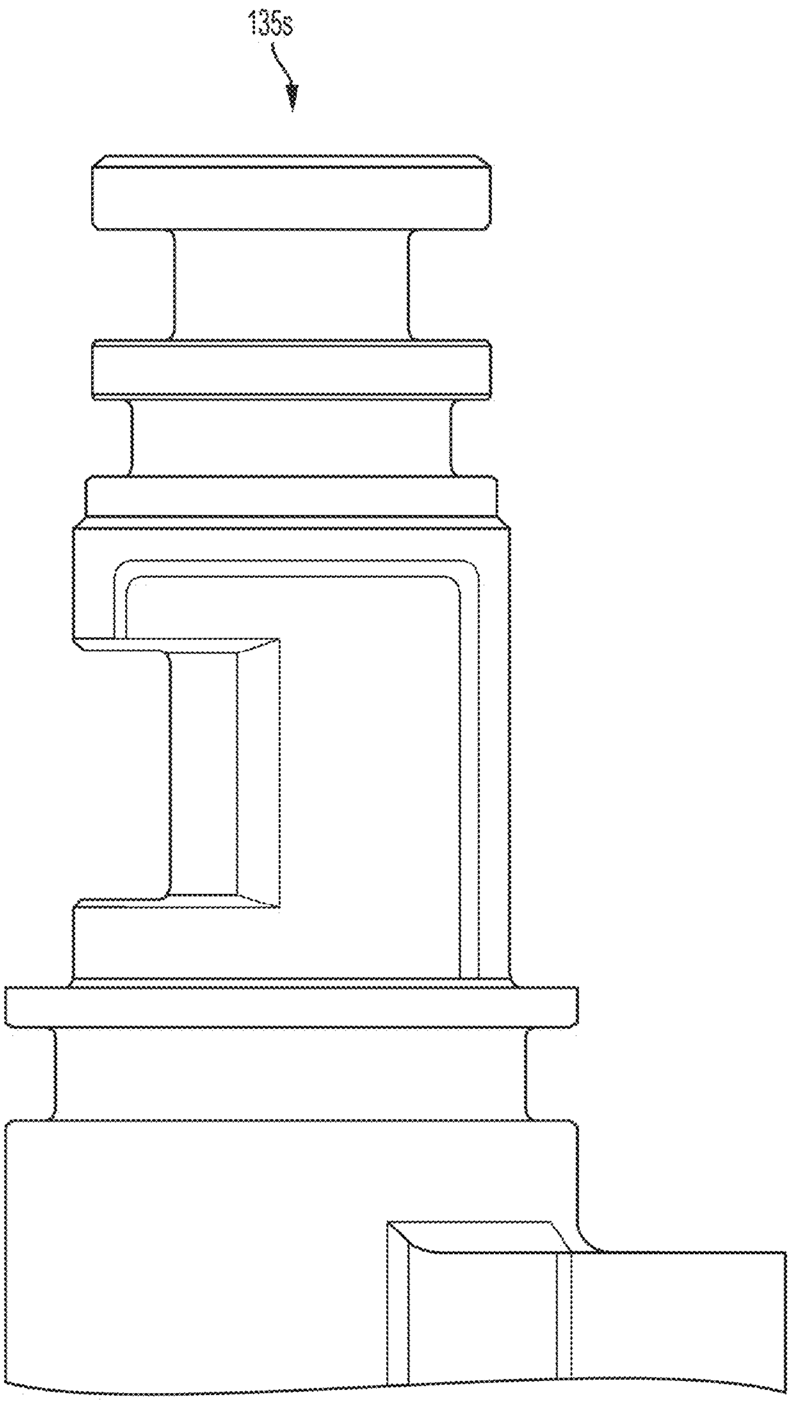

FIGS. 11A-B illustrate a diverter unit 130 and its associated components, according to some embodiments. In particular, as shown in the exploded view of diverter unit 130 in FIG. 11A, front portion 136 of diverter unit 130 includes a flat front surface 136*f*, a pair of arms 131*a*, and a plurality of channels 134. In addition to front portion 136, diverter unit 130 can include a mating rear housing that, together with front portion 136, encloses a body 137 that houses, inter alia, a manifold 139 for controlling water flow to shower head 110 and hand shower 120. A ball joint 133 can be disposed at a rear inlet 130*a* of the mating rear housing to fluidly couple diverter unit 130 to water outlet tube 90, as described with respect to FIGS. 1A, 7, and 8. A lower outlet 130*b* within the mating rear housing can be fluidly coupled to hand shower 120 via hose 170, as described with respect to FIG. 1B.

In some embodiments, diverter unit 130 can be operable via paddle lever 135 to selectively direct water flow through hand shower 120 and, additionally, shower head 110. Paddle lever 135 can be configured to interoperate with a shaft 135*s* with seal (shown in greater detail in FIG. 11B) to communicate a water flow selection to body 137 of diverter unit 130. Although shaft 135*s* is shown as the mechanism used to control water flow selection in FIG. 11A, other types of fluid control mechanisms may be implemented. For example, paddle lever 135 can be configured to communicate the water flow selection to a magnetic valve, an electronic value, or other types of diverter elements for controlling water flow.

In some embodiments, the selection of a water flow can be selected by the user by actuating paddle lever 135. For example, the user may push down or lift up paddle lever 135, as described above with respect to FIGS. 1A-D. In some embodiments, the act of removably attaching or detaching hand shower 120 to or from diverter unit 130, respectively, triggers paddle lever 135 to select a water flow. For example, paddle lever 135 may be coupled to arms 131*a* such that the weight of an attached hand shower 120 may actuate paddle lever 135.

Figure 12A:
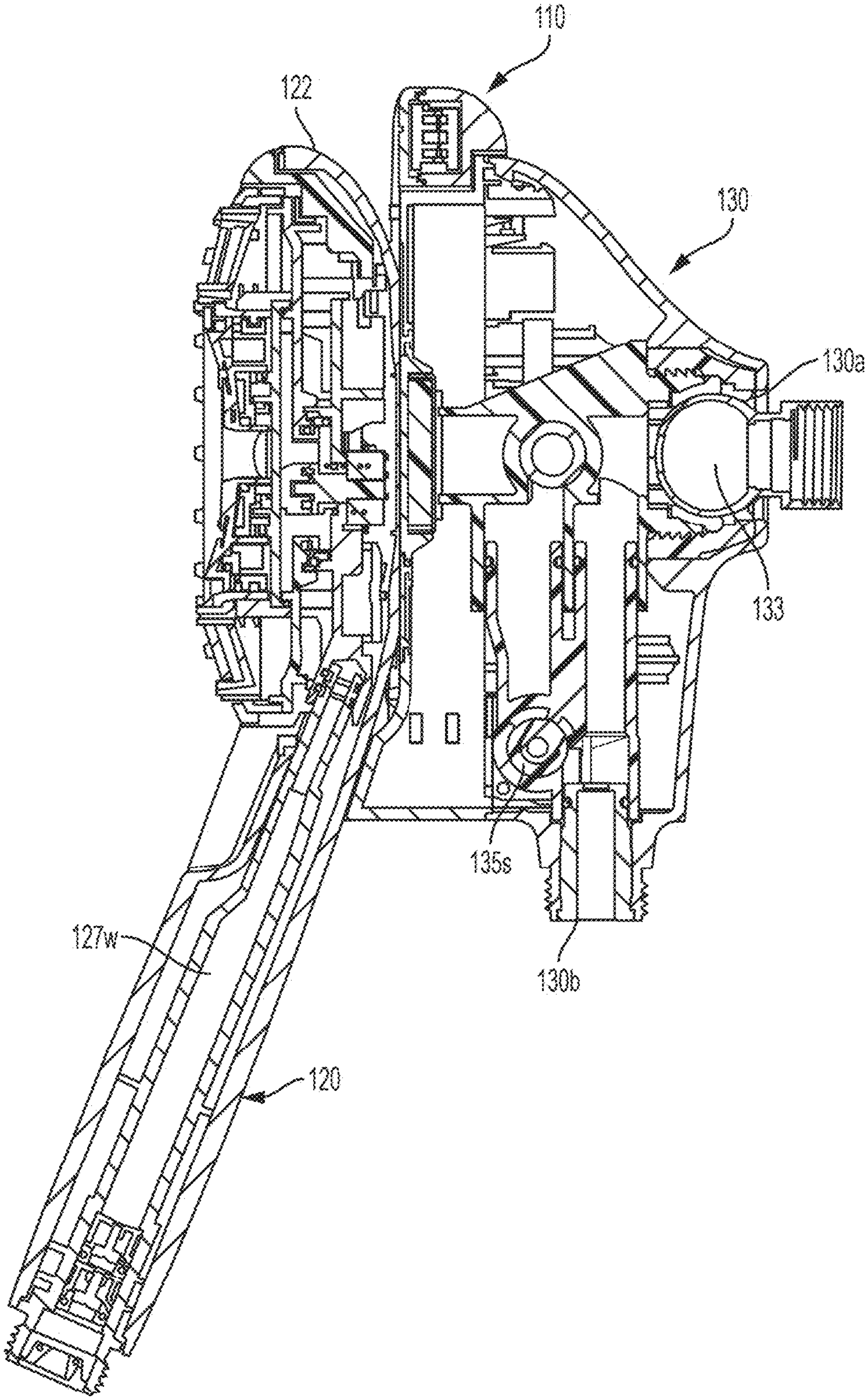
FIGS. 12A-B illustrate cross-sectional views of the shower system, according to some embodiments.
Figure 12B:
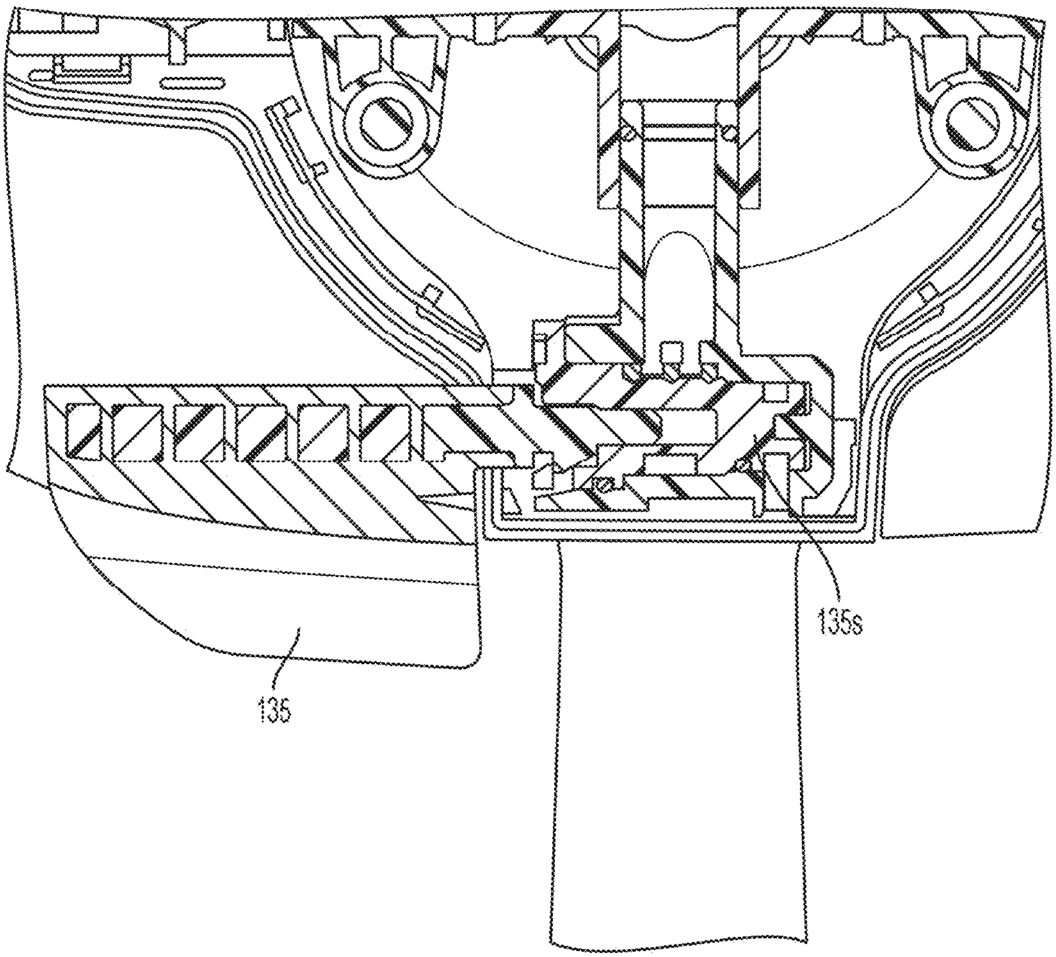

FIGS. 12A-B illustrate cross-sectional views of shower system 100, according to some embodiments. In particular, FIG. 12A illustrates a cross-sectional view of shower system 100 when hand shower 120 is attached to diverter unit 130. As shown in FIG. 12A, spray head portion 122 of hand shower 120 sits proud with respect to shower head 110 and diverter unit 130. As described with respect to FIG. 11A and shown in FIG. 12A, diverter unit 130 includes a ball joint 133 disposed at a rear inlet 130*a* of diverter unit 130. In some embodiments, diverter unit 130 can include shaft 135*s* to control whether water received via rear inlet 130*a* can be permitted to flow to shower head 110. In some embodiments, such as that shown in FIG. 12A, shaft 135*s* does not impede the flow of water from rear inlet 130*a* through lower outlet 130*b*. A hose (e.g., hose 170) of hand shower 120 may be connected to lower outlet 130*b* to allow water from diverter unit 130 to flow into hand shower 120 and out of spray head portion 122, effectively fluidly coupling hand shower 120 to diverter unit 130. For example, hand shower 120 may include waterway 127*w* within the hose to facilitate water flow into hand shower 120.

FIG. 12B illustrates a cross-sectional view of diverter unit 130 including paddle lever 135 connected to shaft 135*s*, according to some embodiments. In some embodiments, a pushing or a pressing force exerted on paddle lever 135 can translate into a rotational movement on shaft 135*s*. For example, pressing down on paddle lever 135 may rotate 135*s* in a counterclockwise direction. Similarly, lifting up on paddle lever 135 may rotate 135*s* in a clockwise direction. As will be further described below, shaft 135*s* may be rotated to selectively direct water flow into shower head 110.

Accordingly, diverter unit 130 can be configured to selectively direct water flow into shower head 110 and hand shower 120 based on an amount of rotation of shaft 135*s*. In some embodiments, paddle lever 135 can be configured to be able to be actuated between two positions: a first position in which water flow is selectively directed only through hand shower 120; and a second position in which water flow is directed through hand shower 120 and shower head 110. In some embodiments, paddle lever 135 can be configured to be able to be actuated between three positions: the first and second positions as described above and a third position in which water flow is directed only through shower head 110.

In some embodiments, the rotation of shaft 135*s* can be controlled via paddle lever 135. For example, a movement of paddle movement can cause shaft 135*s* to rotate to seal off or open one or more water flow pathways to permit water to flow through, for example, shower head 110. Therefore, paddle lever 135 being actuated in a certain position can cause shaft 135*s* to rotate by a specific amount to control water flow in one of the manner discussed above.

In some embodiments, the rotation of shaft 135*s* can be controlled via a remote device (e.g., a remote or a smart phone). For example, an electronic chip may be connected to hand shower 120 to wirelessly receive a command from the remote device and to electronically control the amount of rotation.

Figure 13A:
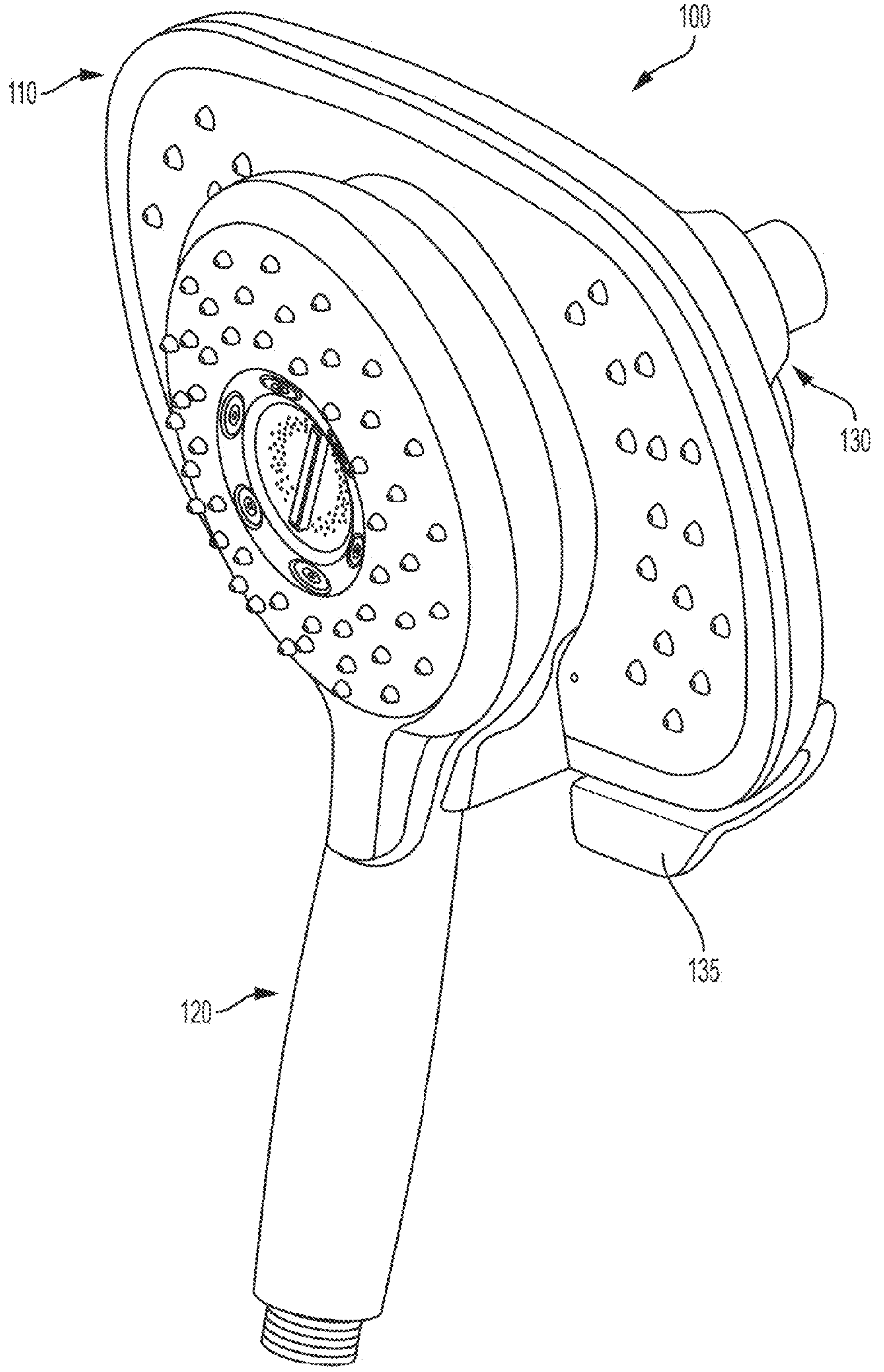
FIG. 13A illustrates a shower system with a paddle lever set to a first position, according to some embodiments.

FIG. 13A illustrates shower system 100 with paddle lever 135 of diverter unit 130 set to a first position, according to some embodiments. For example, the first position may be when paddle lever 135 is lifted upwards such that the gap between paddle lever 135 and a bottom portion of shower head 110 is reduced. FIG. 13A shows the first position of paddle lever 135 being actuated when hand shower 120 is coupled to diverter unit 130. However, in some embodiments, the first position of paddle lever 135 may be actuated in an uncoupled configuration where hand shower 120 is decoupled from diverter unit 130 (e.g., as shown in FIGS. 2A and 2B).

Figure 13B:
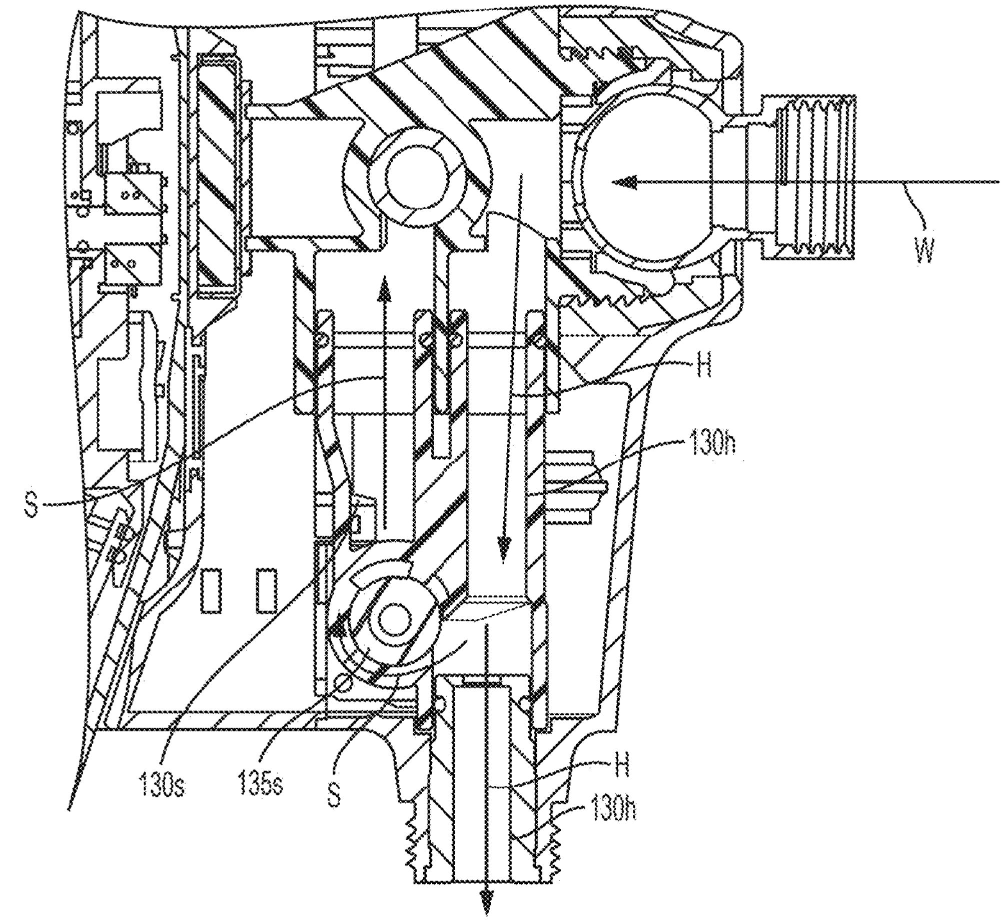
FIGS. 13B-C illustrate water flow in the shower system when the paddle lever is set to the first position, according to some embodiments.
Figure 13C:
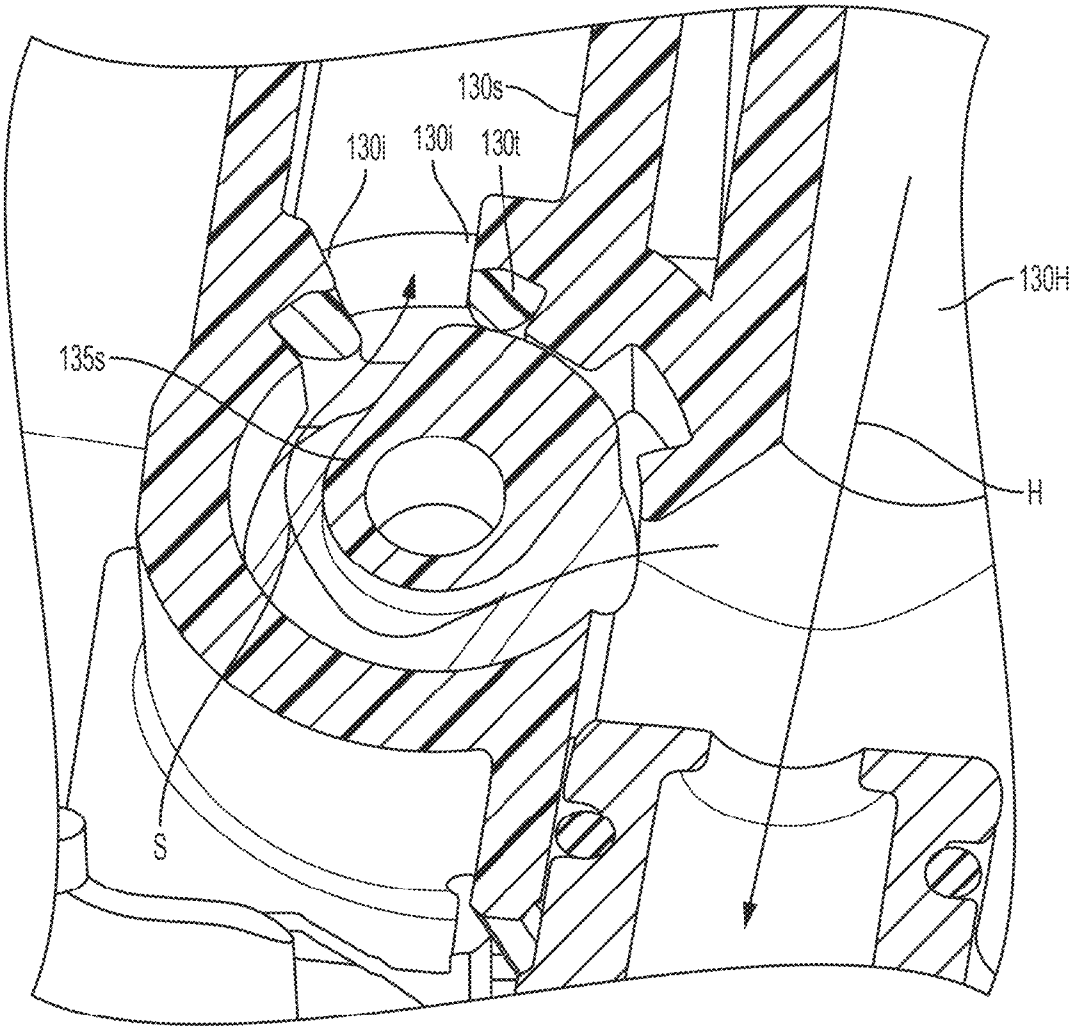

FIGS. 13B-C illustrate water flow in shower system 100 when paddle lever 135 is set to the first position illustrated in FIG. 13A, according to some embodiments. In some embodiments, paddle lever 135 being set to the first position may configure shaft 135*s* to open an additional water flow pathway to shower head 110. Accordingly, water entering diverter unit 130, indicated by the arrow labeled W, can flow through waterway 130*h* toward hand shower 120 in the direction indicated by the arrows labeled H. Water can also flow through waterway 130*s* toward shower head 110 in the direction indicated by the arrows labeled S, particularly about a portion of shaft 135*s*, through a gap in a sealing ring 130*t*, and into an inlet 130*i* (as illustrated in FIG. 13B).

Figure 14A:
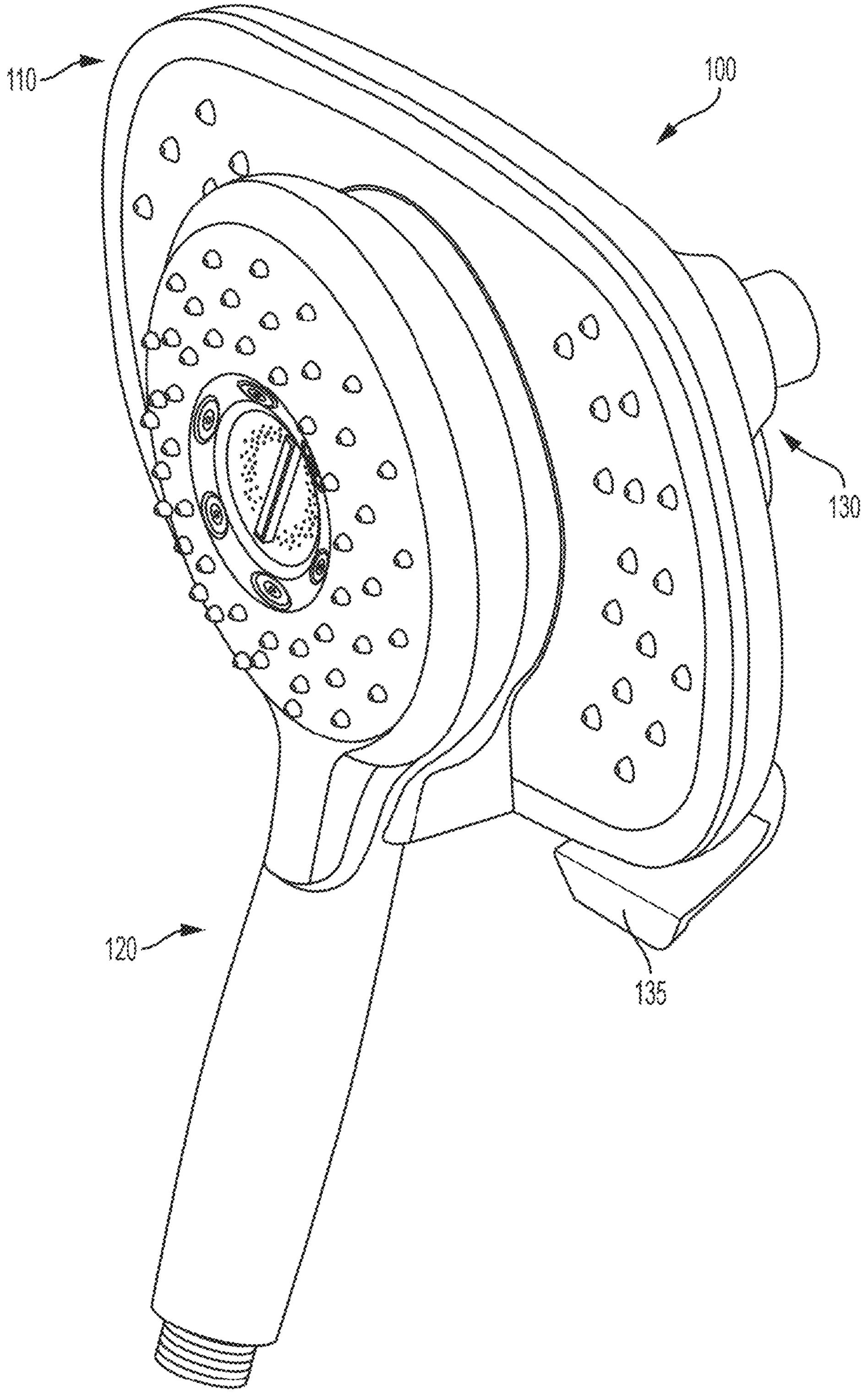
FIG. 14A illustrates a shower system with a paddle lever set to a second position, according to some embodiments.

FIG. 14A illustrates shower system 100 with paddle lever 135 of diverter unit 130 set to a second position, according to some embodiments. For example, the second position may be when paddle lever 135 is pushed downwards such that the gap between paddle lever 135 and a bottom portion of shower head 110 is increased. FIG. 14A shows the second position of paddle lever 135 being actuated when hand shower 120 is coupled to diverter unit 130. However, in some embodiments, the second position of paddle lever 135 may be actuated in an uncoupled configuration where hand shower 120 is decoupled from diverter unit 130 (e.g., as shown in FIGS. 2A and 2B).

Figure 14B:
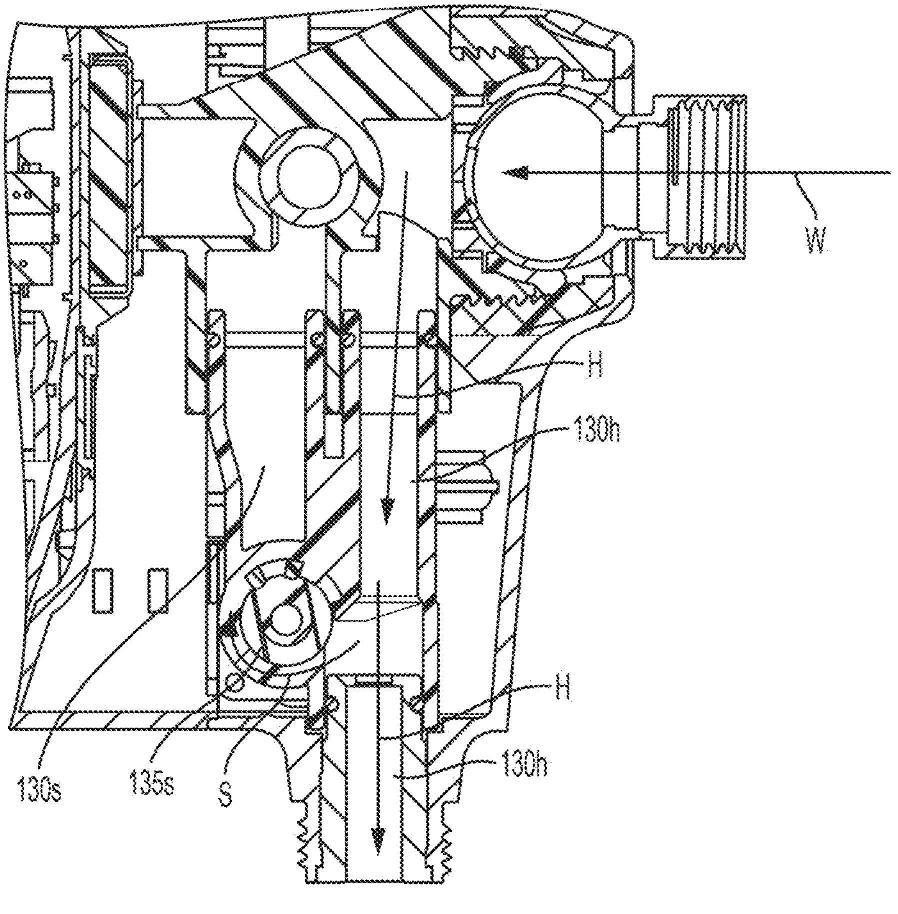
FIGS. 14B-C illustrate water flow in the shower system when the paddle lever is set to the second position, according to some embodiments.
Figure 14C:
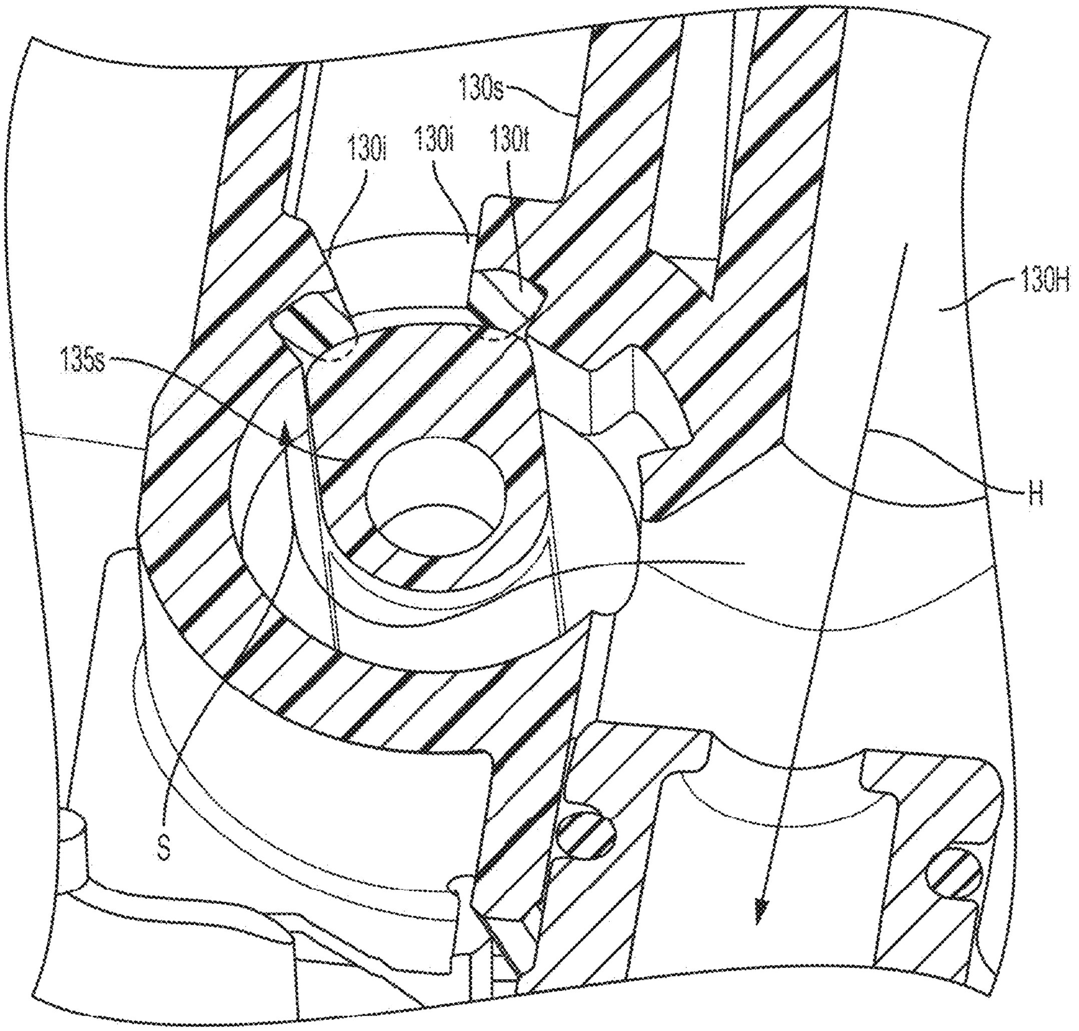

FIGS. 14B-C illustrate water flow in shower system 100 when paddle lever 135 is set to the second position illustrated in FIG. 14A, according to some embodiments. In some embodiments, paddle lever 135 being set to the second position may configure shaft 135*s* to seal of an additional water flow pathway to shower head 110. Accordingly, water entering diverter unit 130, indicated by the arrow labeled W, can flow through waterway 130*h* toward hand shower 120 in the direction indicated by the arrows labeled H. However, in contrast to water flows shown in FIGS. 13B-C, shaft 135*s* closes the gap in sealing ring 130*t*, preventing water flowing in the direction indicated by the arrows labeled S from entering inlet 130*i* (as illustrated in FIG. 14B) into waterway 130*s* and toward shower head 110.

Figure 15A:
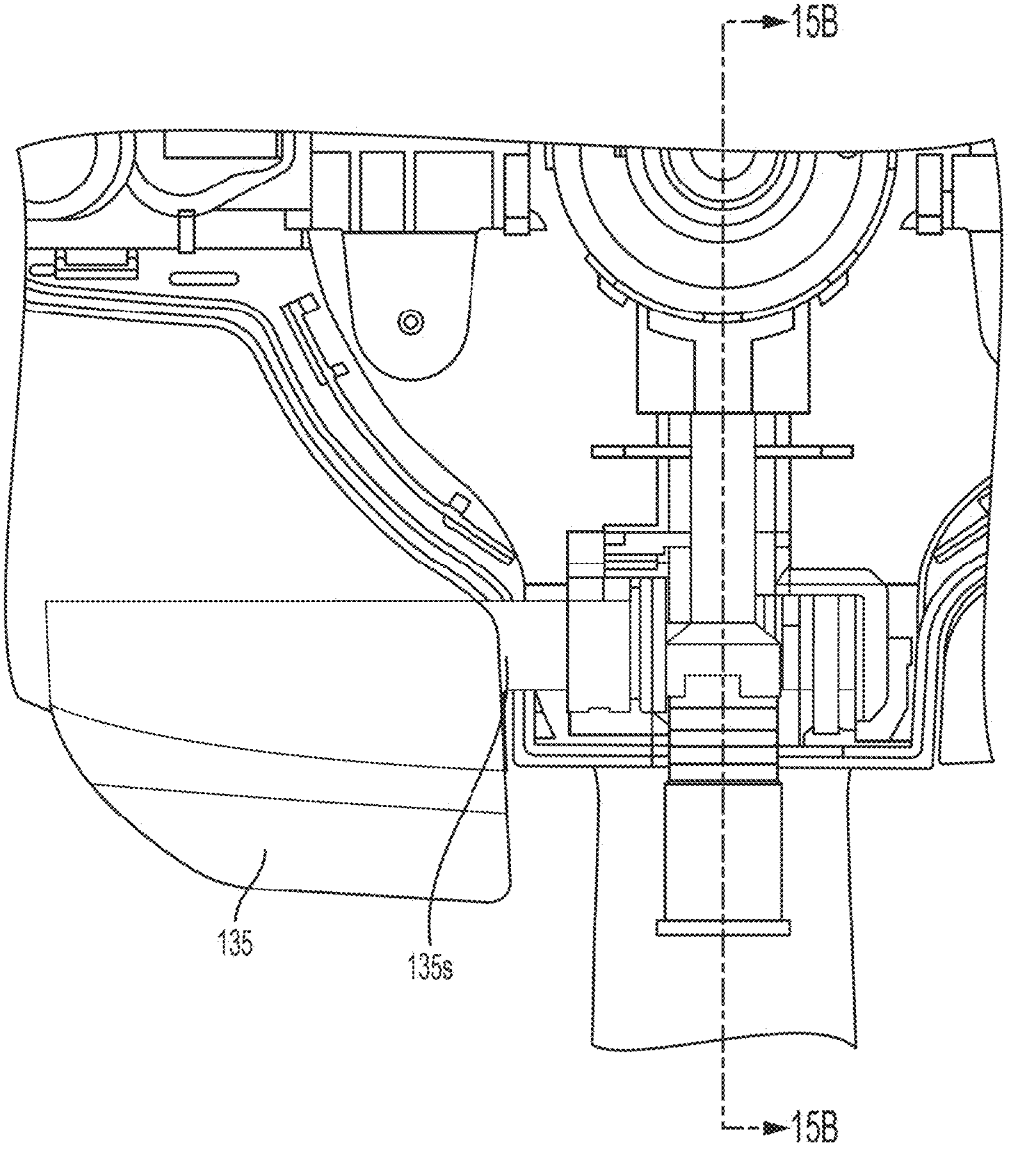
FIGS. 15A-B illustrate cross-sectional views of the diverter unit in the shower system, according to some embodiments.
Figure 15B:
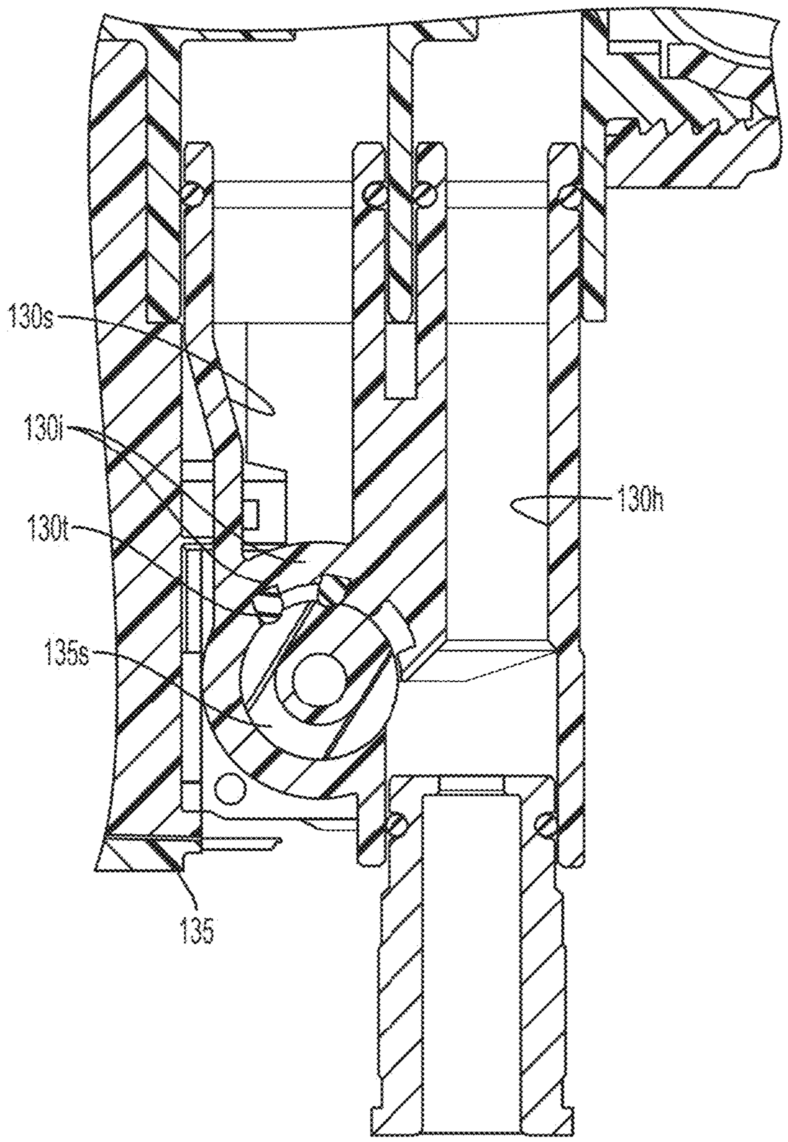

FIGS. 15A-B illustrate cross-sectional views of diverter unit 130 in the shower system 100, according to some embodiments. FIG. 15A illustrates paddle lever 135 in the second position, as described with respect to FIG. 14A. When an upwards force is exerted on paddle lever 135, shaft 135*s* may be caused to rotate in a counterclockwise direction to open one or more water flow pathways, close one or more water flow pathways, or a combination thereof. Similarly, a downwards force exerted on paddle lever 135 may cause shaft 135*s* to rotate in a clockwise direction to open one or more water flow pathways, close one or more water flow pathways, or a combination thereof.

FIG. 15B illustrates a cross-sectional view of diverter unit 130 when paddle lever 135 has been changed from the first position illustrated in FIG. 15A to the second position, as further described with respect to FIG. 13A. FIG. 15B may correspond to FIG. 13B where water entering diverter unit 130 can flow through waterway 130*h* toward hand shower 120. Additionally, shaft 135*s* can be associated with a specific rotation amount to additionally permit flow of water through waterway 130*s* about a portion of shaft 135*s* and through a gap in sealing ring 130*t* into inlet 130*i* of waterway 130*s*. Waterway 130*s* may be connected to a shower head 110 to allow shower head 110 to output water.

Accordingly, the present disclosure describes a modular shower system that includes a shower head (e.g., shower head 110) removably and interchangeably attached to a diverter unit (e.g., diverter unit 130), and a hand shower (e.g., hand shower 120) that is also removable attached (e.g., magnetically dockable) to the diverter unit. In some embodiments, selective water flow through the hand shower and the shower head can be controlled via a paddle lever (e.g., paddle lever 135) conveniently located proximate the shower head when the shower head is removably attached to the diverter unit.

It will thus be seen that the aspects, features, and advantages made apparent from the foregoing disclosure are efficiently attained and, since certain changes may be made without departing from the spirit and scope of the disclosure, it is intended that all matter contained herein shall be interpreted as illustrative and not in a limiting sense.

The invention claimed is:

1. A hand shower comprising:

a spray head portion comprising a plurality of nozzles configured to dispense fluid and a back surface comprising a curved portion and a flat portion, wherein the curved portion of the back surface is dome-shaped and extends from a front surface of the spray head portion to the flat portion of the back surface; and a handle connected to the spray head portion, wherein the hand shower is configured to be fluidly coupled by a hose to a diverter unit of a shower assembly such that the flat portion of the back surface of the spray head portion is in full contact with a flat front-most surface of the diverter unit, the hand shower is configured to be removably attached to the diverter unit by a magnetic connector, and the spray head portion is configured to sit proud with respect to a shower head that comprises a flat front-most surface aligned with the flat front-most surface of the diverter unit, and the diverter unit such that the curved portion of the back surface of the spray head portion is located forward of a front-most surface of the shower head and the diverter unit when the flat portion of the back surface of the spray head portion is in full contact with the front-most surface of the diverter unit such that the hand shower is configured to be detached from the diverter unit when a user grabs the hand shower by the curved portion of the back surface of the spray head portion, wherein, when the flat portion of the back surface of the hand shower is in contact with the flat front-most surface of the diverter unit, the dome-shaped curved portion of the back surface of the hand shower and the shower head form a gap that widens along the curvature of the dome-shaped curved portion of the back surface of the hand shower.

2. The hand shower of claim 1, comprising a button that is configured to control a spray mode of the plurality of nozzles.

3. The hand shower of claim 2, wherein the button is integrated within a diverter ring.

4. The hand shower of claim 1, wherein the hand shower comprises the connector.

5. The hand shower of claim 1, wherein the diverter unit comprises the connector.

6. The hand shower of claim 1, wherein the hand shower is configured to removeably attach to the front-most surface of the diverter unit magnetically.

7. The hand shower of claim 1, wherein the hand shower is configured to detach from the diverter unit when a pulling force is exerted on the handle.

8. The hand shower of claim 1, wherein the spray head portion comprises a nozzle unit, wherein the plurality of nozzles are disposed through a faceplate of the nozzle unit.

9. The hand shower of claim 8, wherein the spray head portion comprises a nozzle plate configured to sandwich the nozzle unit with the faceplate.

10. The hand shower of claim 1, wherein the plurality of nozzles comprises a massage nozzle.

11. The hand shower of claim 1, wherein the hand shower is connected to an electronic chip that is configured to wirelessly receive a command from a remote device to electronically control flow of fluid to the hand shower.

12. The hand shower of claim 1, wherein, when the flat portion of the back surface of the hand shower is in contact with the flat front-most surface of the diverter unit, the dome-shaped curved portion of the back surface of the hand shower extends in front of the shower head.

* * * * *